US011821698B2

(12) United States Patent
Libert et al.

(10) Patent No.: US 11,821,698 B2
(45) Date of Patent: Nov. 21, 2023

(54) TECHCLEAN DIRECT HEAT EXCHANGE FILL

(71) Applicant: Evapco, Inc., Taneytown, MD (US)

(72) Inventors: Jean-Pierre Libert, Taneytown, MD (US); Andrew Carl, Taneytown, MD (US); Aaron Reilly, Taneytown, MD (US)

(73) Assignee: Evapco, Inc., Taneytown, MD (US)

( * ) Notice: Subject to any disclaimer, the term of this patent is extended or adjusted under 35 U.S.C. 154(b) by 103 days.

(21) Appl. No.: 17/666,085

(22) Filed: Feb. 7, 2022

(65) Prior Publication Data

US 2022/0252363 A1  Aug. 11, 2022

Related U.S. Application Data

(60) Provisional application No. 63/146,179, filed on Feb. 5, 2021, provisional application No. 63/146,579, filed on Feb. 6, 2021.

(51) Int. Cl.
*F28F 3/02* (2006.01)
*F28F 25/08* (2006.01)

(52) U.S. Cl.
CPC ............ *F28F 25/087* (2013.01); *F28F 3/025* (2013.01)

(58) Field of Classification Search
CPC ................................ F28F 3/025; F28F 25/087
USPC ....................................................... 261/112.2
See application file for complete search history.

(56) References Cited

U.S. PATENT DOCUMENTS

| 2,977,103 | A | | 3/1961 | Smith et al. | |
|---|---|---|---|---|---|
| 3,887,664 | A | * | 6/1975 | Regehr | B01J 19/32 165/166 |
| 3,952,077 | A | | 4/1976 | Wigley | |
| 4,361,426 | A | * | 11/1982 | Carter | F28F 25/087 55/440 |
| 4,514,202 | A | | 4/1985 | Kinney, Jr. et al. | |
| 4,668,443 | A | * | 5/1987 | Rye | F28F 25/087 165/166 |
| 4,670,197 | A | * | 6/1987 | Stackhouse | B01J 19/32 428/185 |
| 5,124,087 | A | * | 6/1992 | Bradley | B01J 19/32 261/112.2 |

(Continued)

FOREIGN PATENT DOCUMENTS

| DE | 2411165 | * | 9/1974 | |
|---|---|---|---|---|
| EP | 0158917 A2 | * | 10/1985 | B01J 19/32 |

OTHER PUBLICATIONS

Partial English Translation of EP 0158917 A (Year: 1985).*
International Search Report issued in copending International Patent Application No. US22/15472 dated May 12, 2022.

*Primary Examiner* — Charles S Bushey
(74) *Attorney, Agent, or Firm* — Whiteford, Taylor & Preston, LLP; Peter J. Davis

(57) ABSTRACT

A fill sheet and a fill pack manufactured from a plurality of fill sheets for cooling a cooling medium in a cooling tower, each fill sheet having a plurality of flutes extending diagonally from top to bottom of the fill sheet, the diagonal orientation of the flutes resulting from a plurality of alternating longer diagonal flute segments and shorter vertical flute segments, each of the plurality of flutes having the microstructure including a plurality of alternating rounded mounds and rounded depressions extending between flat ridge edges and flat valley edges of the flutes.

10 Claims, 26 Drawing Sheets

(56) References Cited

U.S. PATENT DOCUMENTS

| | | | | |
|---|---|---|---|---|
| 5,413,872 A | * | 5/1995 | Faigle | B01J 19/32 |
| | | | | 428/603 |
| 8,985,559 B2 | | 3/2015 | Libert et al. | |
| 11,331,644 B2 | * | 5/2022 | Edwards | F28F 13/08 |
| 2004/0060769 A1 | | 4/2004 | Hentschel et al. | |
| 2006/0001182 A1 | * | 1/2006 | Kinney, Jr. | B01J 19/32 |
| | | | | 261/DIG. 11 |
| 2013/0168881 A1 | | 7/2013 | Libert et al. | |
| 2019/0353425 A1 | * | 11/2019 | Streng | F28C 3/08 |
| 2021/0262741 A1 | | 8/2021 | Edwards et al. | |

* cited by examiner

TECHCLEAN DIRECT HEAT EXCHANGE FILL

BACKGROUND OF THE INVENTION

Field of the Invention

The present invention relates to direct heat exchange fill and fill packs.

Description of the Background

Examples of direct heat exchange fill and fill packs are described in U.S. Pat. No. 8,985,559, the disclosure of which is incorporated herein by reference.

Heat exchangers are well known in industry and are designed to efficiently transfer heat from one medium to another. There are many types and sizes of heat exchangers and a particular type of heat exchanger is typically selected depending upon its use such as for refrigeration, air conditioning, chemical plants, petroleum refineries and power plants.

For power plants, water cooling towers are used to transfer waste heat into the atmosphere. These cooling towers cause the evaporation of water to remove waste heat and cool water to near the wet-bulb air temperature. One type of cooling tower used for power plants is a field-erected hyperboloid cooling tower 10 shown in FIG. 1. Heated water 12h is distributed in the hyperboloid cooling tower 10 over a conventional fill pack assembly 14. As represented in FIG. 1, ambient air AA enters at the bottom of hyperboloid cooling tower 10, flows upwardly through the fill pack assembly 14 and exits the hyperboloid cooling tower 10 as heated air HA while the heated water 12h flows, i.e. drips or rains, downwardly through the fill pack assembly 14 and exits the fill pack assembly 14 as cooled water 12c. This arrangement is commonly known in the industry as "counterflow".

The conventional fill pack assembly 14 comprises a plurality conventional fill packs 13. The fill packs 13 are positioned side-by-side one another inside of the hyperboloid cooling tower 10. Each one of the fill packs 13 includes a plurality of heat exchanger sheets 16 as best shown in FIGS. 2 and 3. The fill pack 13 is referred to as VertiClean™ Film Fill, a trademark of EvapTech located in Edwardsville, Kansas. Each heat exchanger sheet 16 is a corrugated sheet of polyvinyl chloride PVC material configured in a repetitive series of vertically-extending corrugations 15 that define vertically-extending flutes 17 formed between the vertically-extending corrugations 15. These heat exchanger sheets 16 are fabricated by thermoforming sheets of PVC under vacuum.

In FIG. 4, three heat exchanger sheets 16, shown in a partial top planar view, are affixed to each other by an adhesive 18 that is disposed between facially-opposing glue points 20. Note that the glue points 20 are flush with respective ridgelines RL of the corrugations 15. All of the heat exchanger sheets 16 that comprise the fill pack 13 are identical to one another. As is known in the art, to create the air-water flow passages 19 between the identical heat exchanger sheets 16, one of two facially-opposing heat exchanger sheet 16 is rotated 180° relative to a central vertical axis so that only front sides of the two facially-opposing heat exchanger sheets 16 are affixed to each other while only rear sides of two facially-opposing heat exchanger sheets 16 are affixed to each other. This is a commonly-known fabrication technique in the art of fabricating each fill pack 13.

Another conventional fill pack assembly 24 is similar to the fill pack assembly 14 described above except that, as best shown in FIGS. 5-7, the fill pack assembly 24 includes a plurality of fill packs 23 that are fabricated from differently-configured heat exchanger sheets 26. The fill pack 23 is referred to as TechClean™ Film Fill, a trademark of EvapTech located in Edwardsville, Kansas. The heat exchanger sheet 26 is a corrugated sheet of PVC material configured in two repetitive series of foreshortened, offset vertically-extending corrugations 25a and 25b.

The heat exchanger sheet 26 includes a top edge 28, a bottom edge 30 disposed apart from and extending parallel to the top edge 28 and a pair of side edges 32. The side edges 32 are disposed apart from and extend parallel to each other and the pair of side edges 32 are connected to and between the top edge 28 and bottom edge 30 to form a generally rectangular configuration as best shown in FIG. 7. One repetitive series of foreshortened vertically-extending upper corrugations 25a commences adjacent the top edge 28 and extends downwardly therefrom to at least approximately a horizontal midpoint line HMPL of the heat exchanger sheet 26 in FIG. 7. The remaining repetitive series of foreshortened vertically-extending lower corrugations 25b commences adjacent the bottom edge 30 and extends upwardly therefrom to at least approximately the horizontal midpoint line HMPL of the heat exchanger sheet 26. Note that the upper corrugations 25a and the lower corrugations 25b are horizontally offset in a width-wise direction from one another as best shown in FIG. 7. FIG. 8 is an example of two prior art fill sheets connected top to bottom, in which the flutes have short diagonal segments at the top and bottom thereof and feature microstructures thereon.

SUMMARY OF THE INVENTION

The present invention is an improvement to (but incorporates the basic structure, manufacture, and assembly of) the aforementioned fill structure and design in which the number of sheets is reduced, the spacing between sheets is increased by virtue of taller flutes, but the fill pack strength and rigidity are maintained by additional connection points and heat transfer is improved due to novel surface geometry but at substantially reduced cost.

Accordingly, there is provided according to the invention a fill sheet for assembly into a fill pack for cooling a cooling medium in an evaporative cooling tower, the fill sheet having: a first end; a second end extending substantially parallel to the first end and generally perpendicularly relative to a vertical axis (with respect to the air and water travel), the first and second ends extending substantially parallel to a lateral axis of the fill sheet; a plurality of flutes extending generally toward the second end at a first flute angle greater than 17 degrees; and microstructure defined on the plurality of flutes, the plurality of flutes comprising a plurality of alternating diagonal flute segments having a diagonal flute segment length and vertical flute segments having a vertical flute segment length, said diagonal flute segments having a diagonal flute segment length aligned parallel to said first flute angle and said vertical flute segments aligned parallel to said vertical axis, whereas said diagonal flute segment length is 6.1 times said vertical flute segment length; wherein the microstructure comprises a plurality of alternating rounded mounds and rounded depressions extending between flat ridge edges and flat valley edges of the flutes.

According to preferred embodiments of the invention, the microstructure extends substantially parallel to the lateral axis, and/or the first flute angle is approximately 12 to 22 degrees, and/or the plurality of flutes define a flute height, and/or the flute height is approximately 1.44 inches, and/or the rounded mound microstructure have a height of 0.05 inches and a spacing of 0.11 to 0.12 inches along said flutes.

According to another embodiment of the invention, there is provided a cross corrugated fill pack assembly for cooling a fluid flowing through the pack with a gas flowing through the pack in a substantially opposing direction, the fill pack assembly comprising a plurality of identical fill sheets described above and in more detail below, wherein the plurality of fill sheets are arranged so that adjacent sheets are oriented 180 degrees relative to one-another and are attached to each other at corresponding attachment notches located on flute ridges of adjacent fill sheets.

Figure 1:
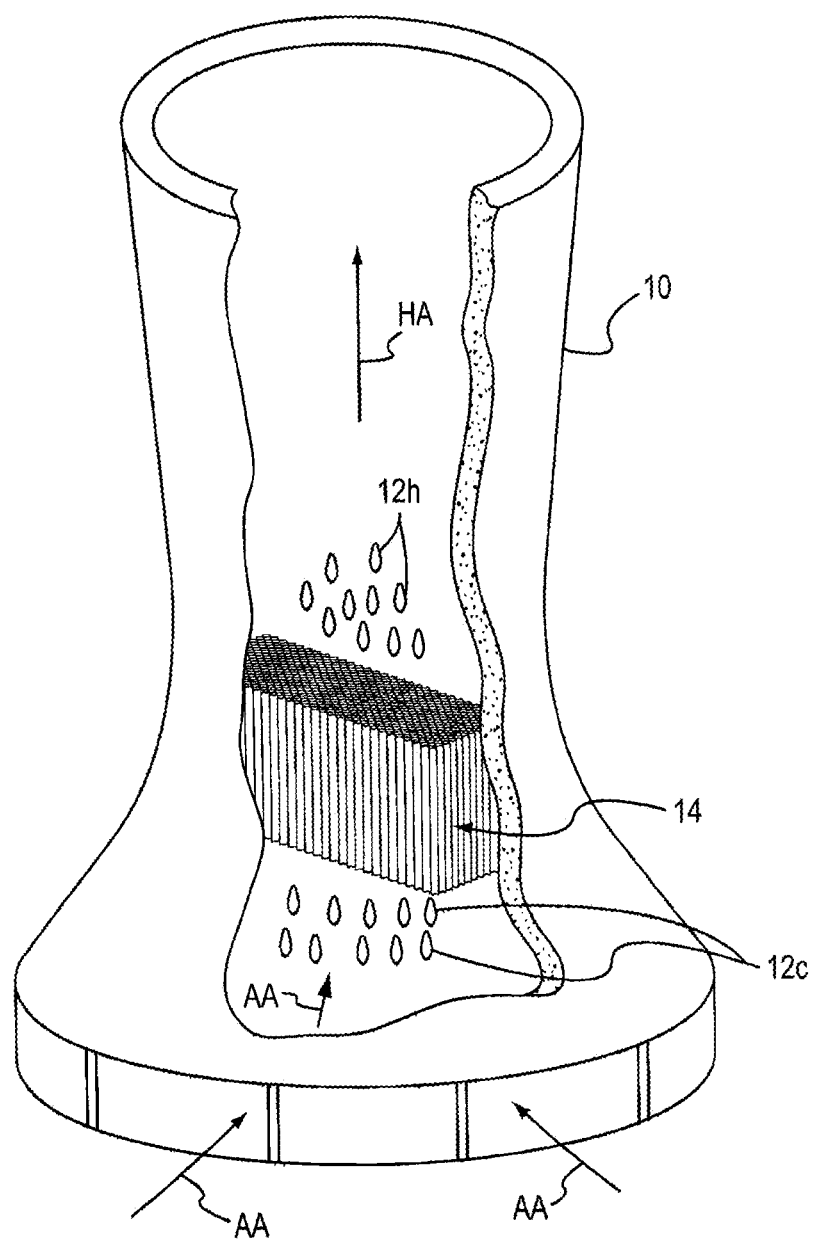
FIG. 1 is a perspective view partially broken away of a prior art hyperboloid water cooling tower with a conventional fill pack assembly disposed therein.
Figure 2:
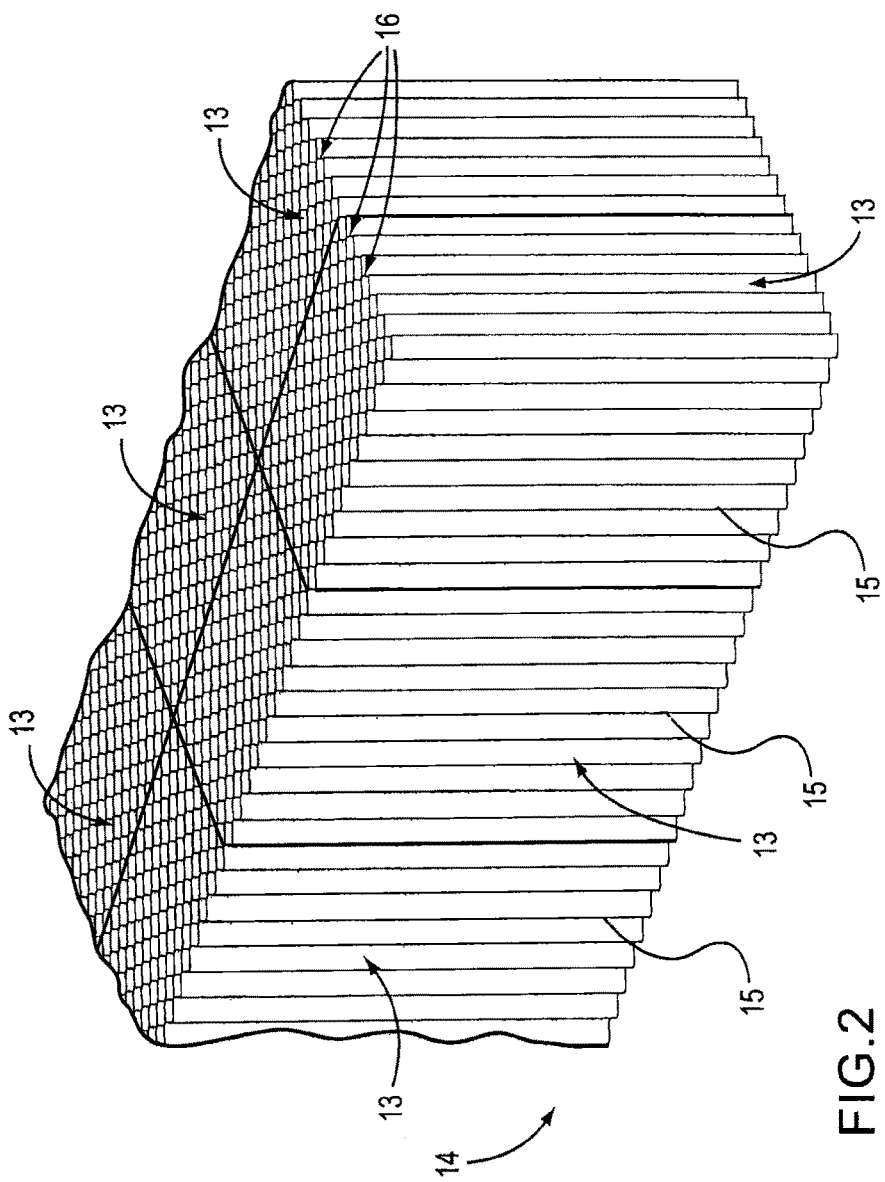
FIG. 2 is a partial perspective view of one type of a prior art fill pack assembly shown in FIG. 1.
Figure 3:
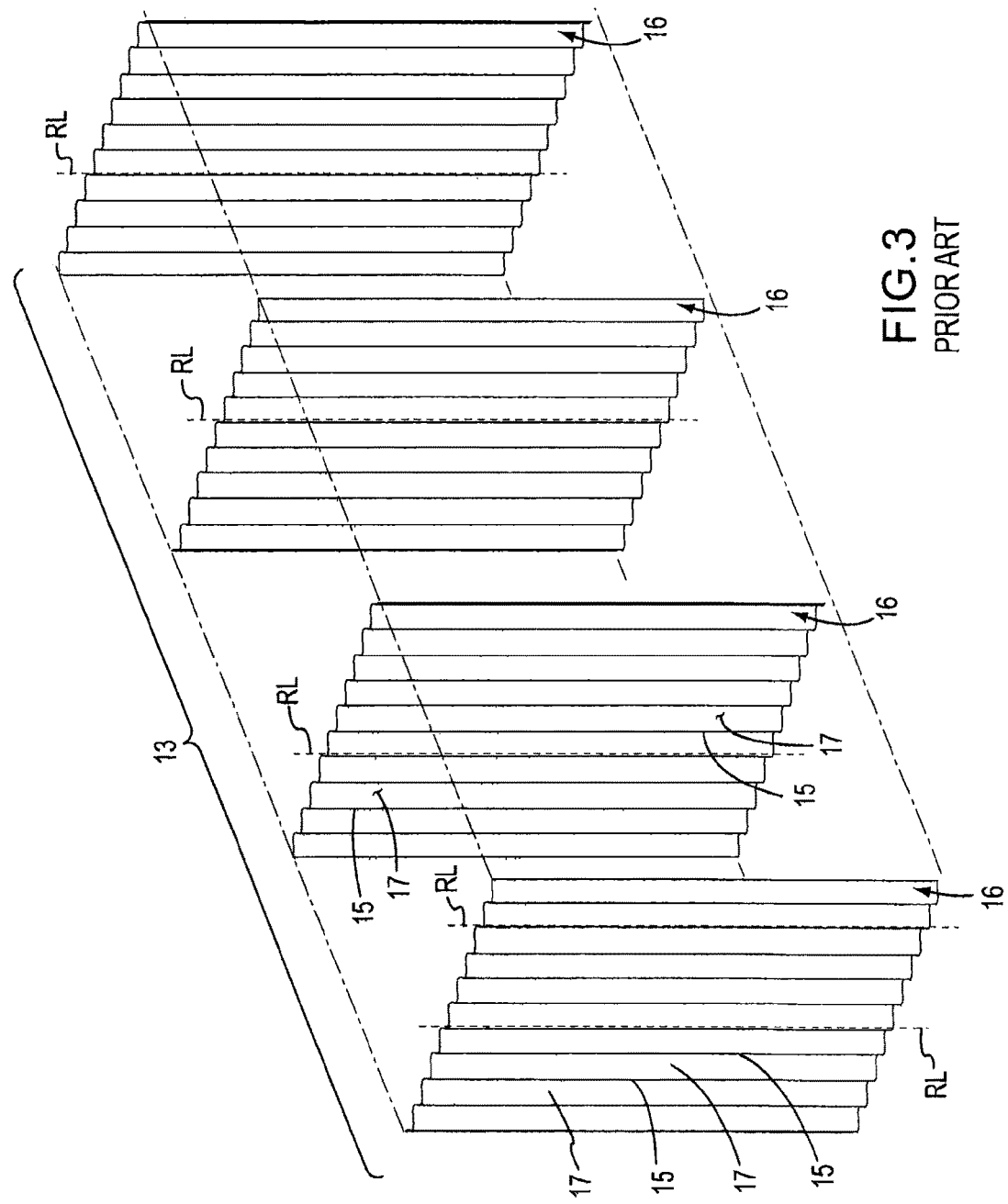
FIG. 3 is an exploded perspective view of the prior art fill pack assembly shown in FIG. 2.
Figure 4:
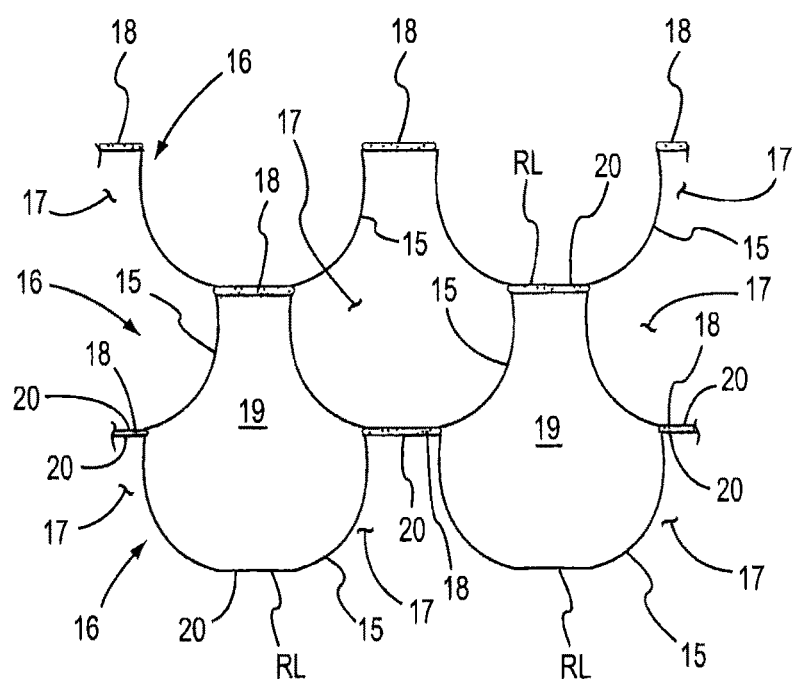
FIG. 4 is a partial top planar view of the prior art fill pack assembly shown in FIGS. 2 and 3.
Figure 5:
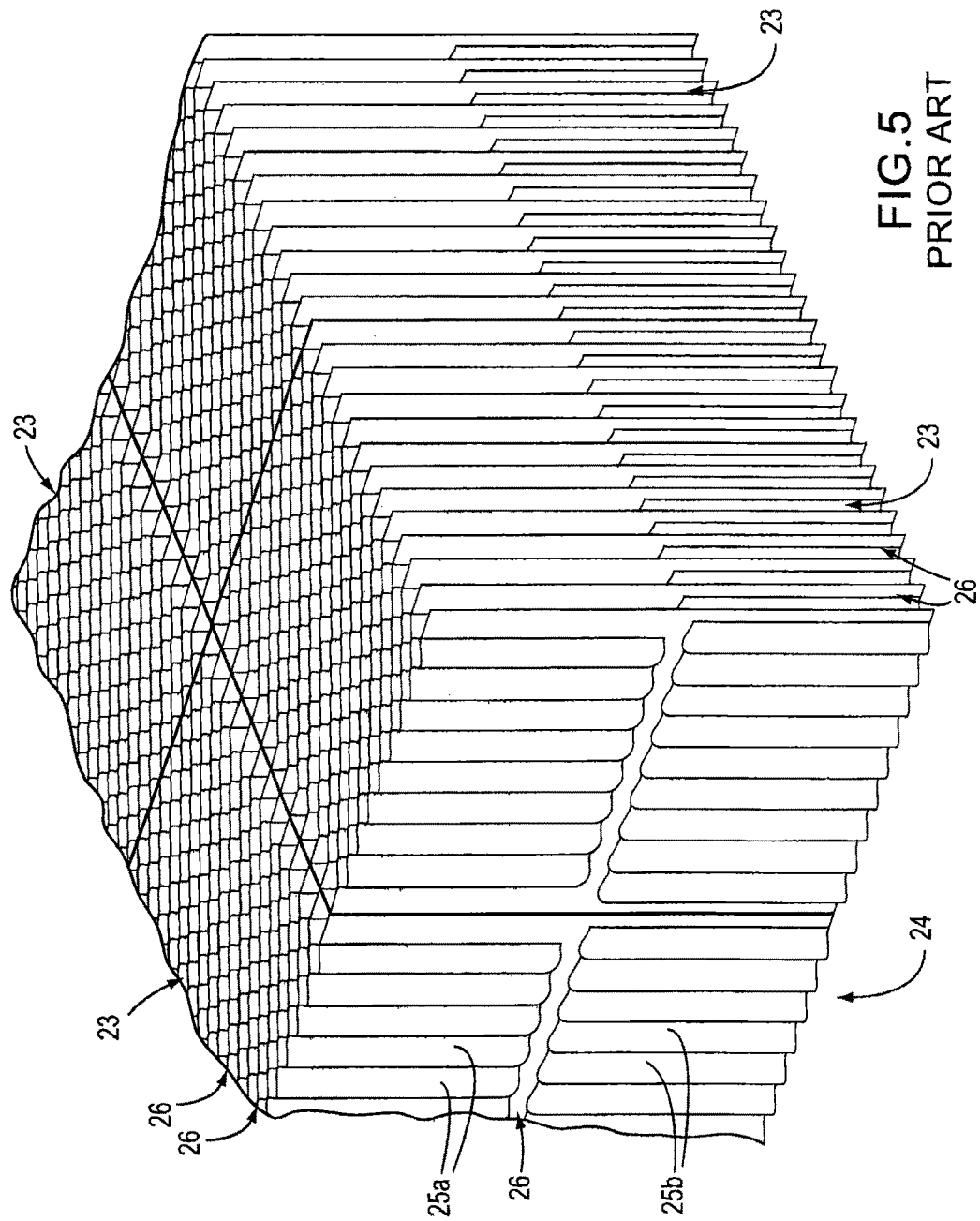
FIG. 5 is a partial perspective view of another type of prior art fill pack assembly.
Figure 6:
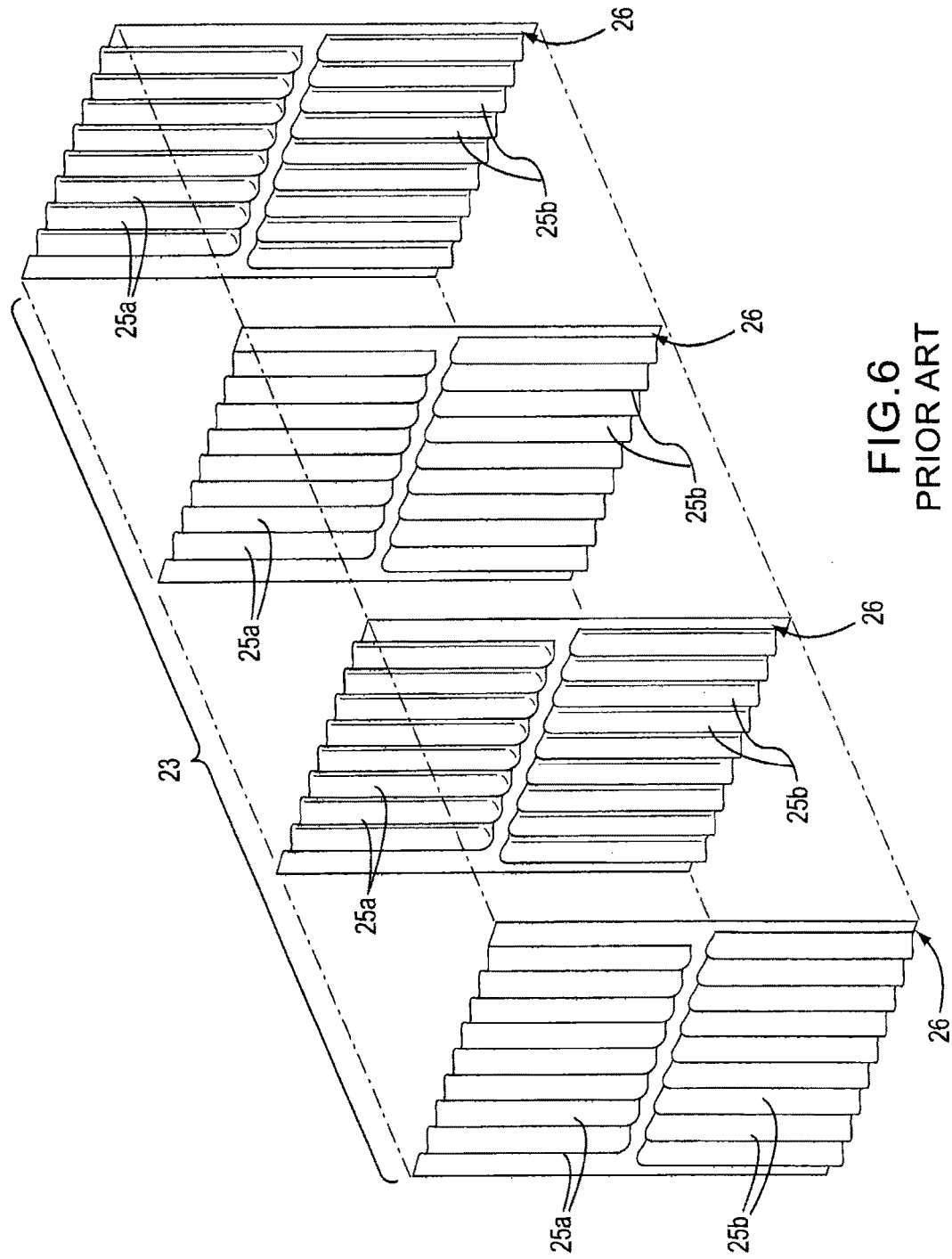
FIG. 6 is an exploded perspective view of the prior art fill pack assembly shown in FIG. 5.
Figure 7:
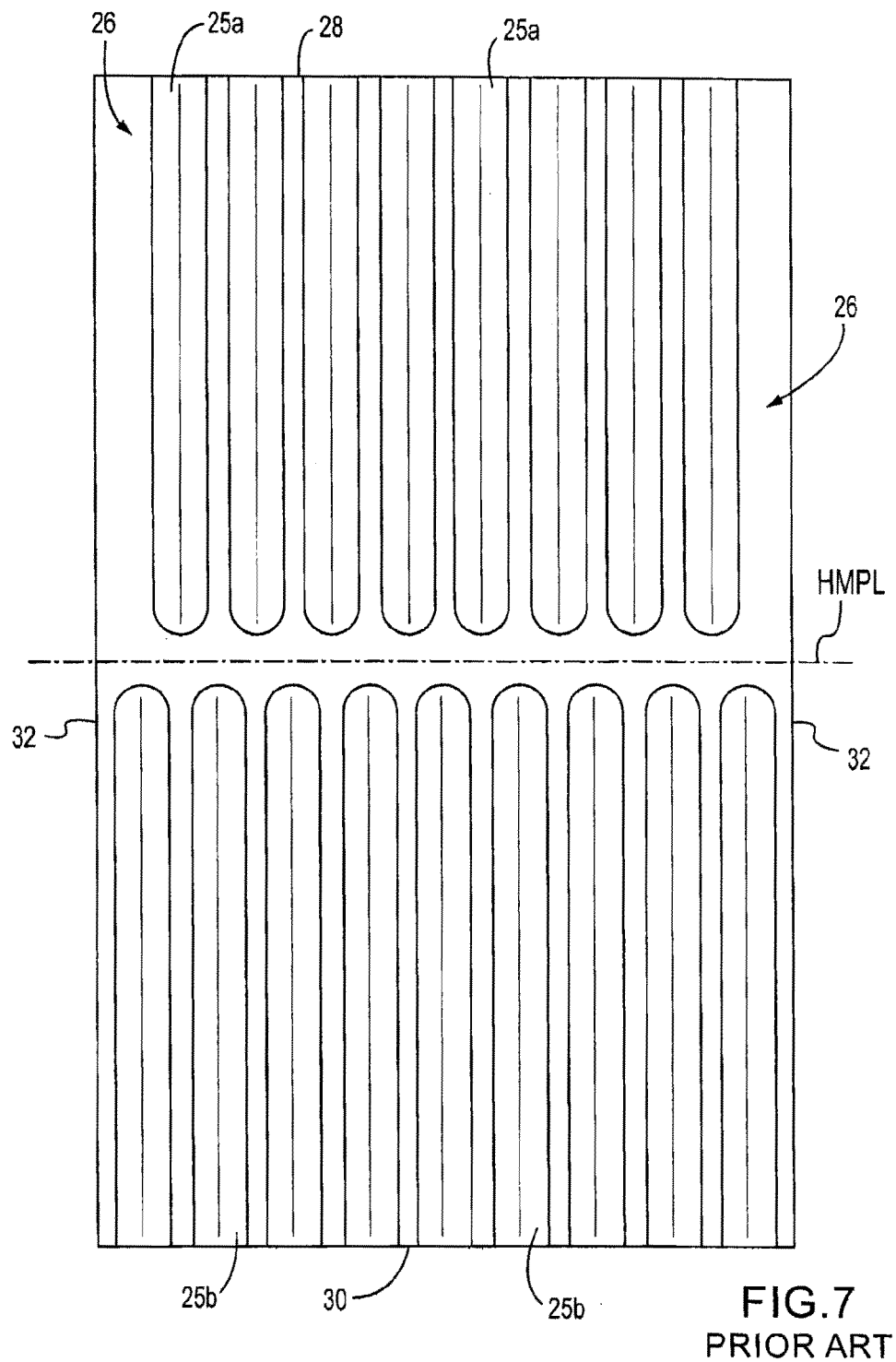
FIG. 7 is a front elevational view of the conventional fill pack assembly shown in FIGS. 5 and 6.
Figure 8:
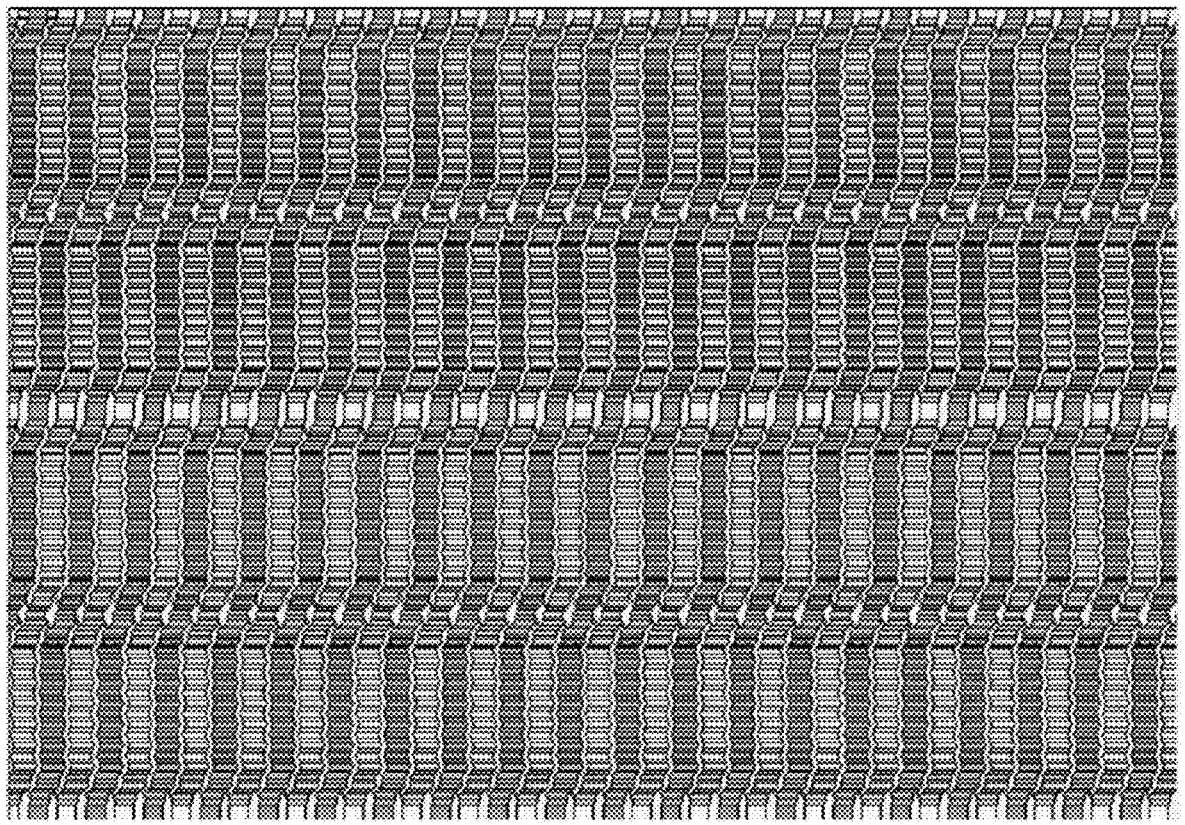
FIG. 8 is a front view of two prior art corrugated fill sheets connected top-to-bottom in which the flutes are primarily vertically oriented, with short diagonal sections and feature microstructures.

Features in the attached drawings are numbered with the following reference numerals:

| | | | |
|---|---|---|---|
| 200 | Fill Pack | 208d | Second Side |
| 202 | Fill Sheet | 210 | Flute |
| 204 | Longitudinal Axis | 212 | Flat Ridge |
| 206 | Lateral Axis | 214 | Flat Side |
| 208a | First End | 216 | Flat Valley |
| 208b | Second End | 218 | Longer Diagonal Flute Segment |
| 208c | First Side | 220 | Shorter Vertical Flute Segment |
| 222 | Connection Notch | 230 | Rounded Depression Microstructure |
| 224 | Raised Plateau | 232 | Flat Flute Side Segment |
| 226 | Connection Point Row | 234 | Diamond-Shaped Plateau Microstructure |
| 228 | Rounded Mound Microstructure | 236 | Diamond Shaped Depression Microstructure |

DETAILED DESCRIPTION OF THE PREFERRED EMBODIMENTS

Figure 9:
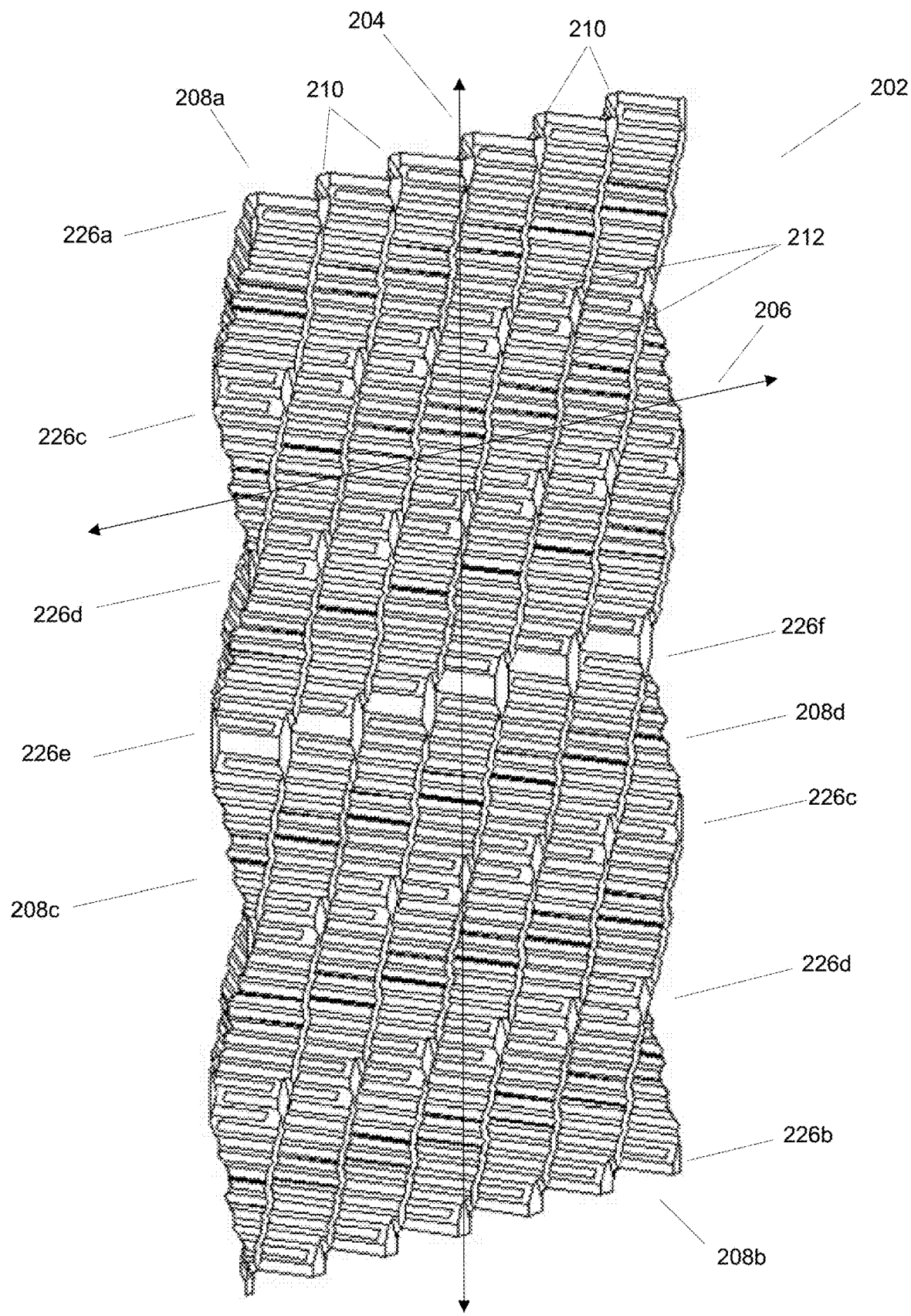
FIG. 9 is a perspective view of a 2' tall×1' wide fill sheet according to an embodiment of the invention.
Figure 10:
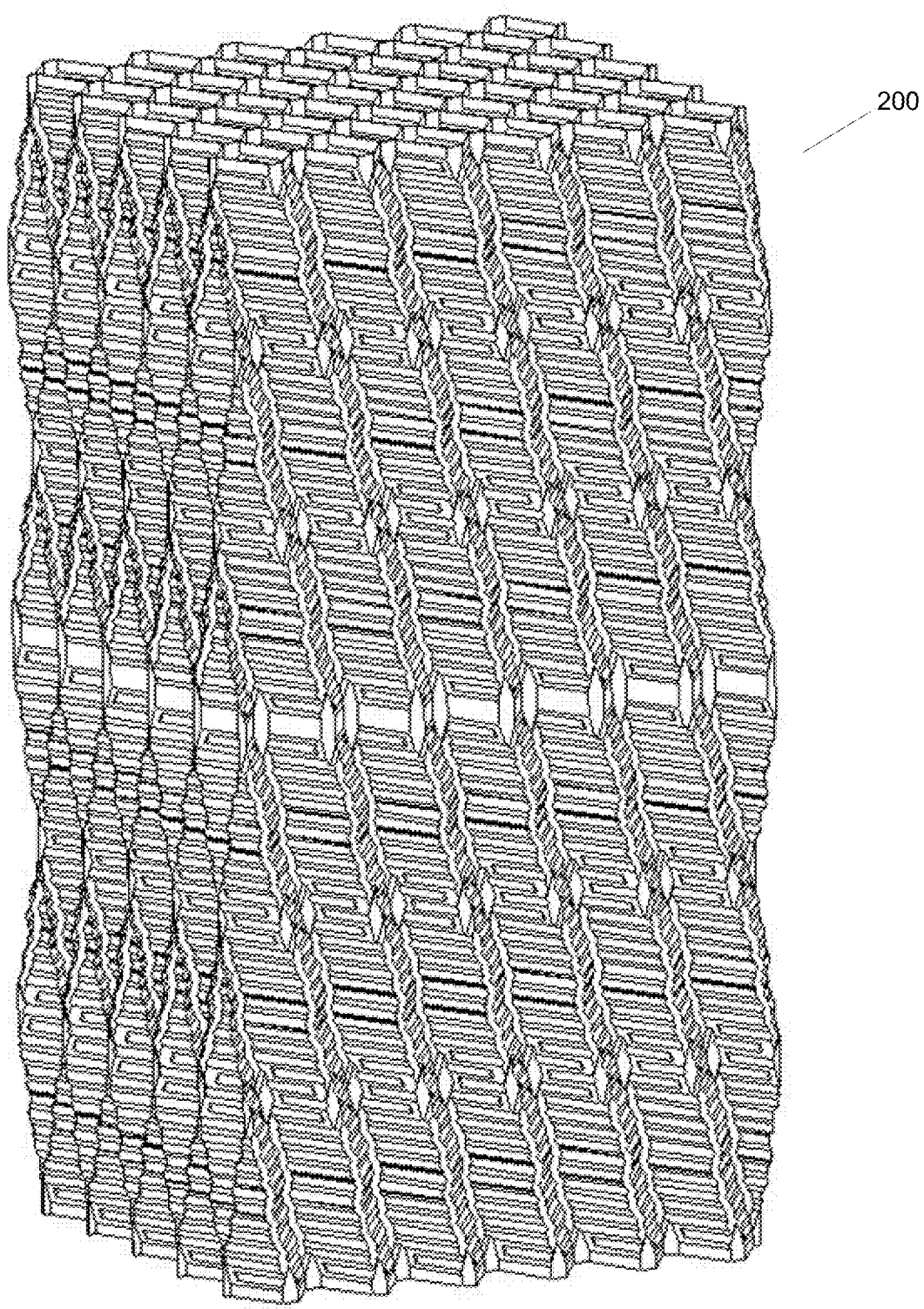
FIG. 10 is a perspective view of a 2' tall×1' wide×1' deep fill pack assembled from fill sheet sets shown in FIG. 9

Referring to FIGS. 9 and 10, for example, the invention is directed to a cross corrugated media, fill pack or assembly 200 comprised of a plurality of identical stacked and engaged fill sheets 202. In the most preferred embodiment, the cross corrugated media or fill pack 200 having a width of one foot (1') includes ten (10) stacked and engaged fill sheets, where width of the fill pack 200 is measured from the frontmost fill sheet to the backmost fill sheet of the fill pack. The cross corrugated media or fill 200 and each of the sheets 202 define a vertical axis 204 extending generally vertically (in the direction of the air travel) and a lateral axis 206 extending generally laterally relative to the fill sheets 202. The air and water flow through the fill pack 200 is generally along the vertical axis 204 between first and second ends 208a, 208b of the sheets 202. First and second ends 208a and 208b of the fill sheets 202 are joined by first and second sides 208c and 208d. The first end 208a extends substantially parallel to the second end 208b and generally perpendicular relative to the longitudinal axis 204. The first and second ends 208a, 208b extend substantially parallel to the lateral axis 206. Each fill sheet is preferably manufactured from polyvinyl chloride (PVC) and preferably has a thickness of 0.010 to 0.025 inches (10 mils to 20 mils) and more preferably of 0.015 to 0.020 inches (15 mils to 20 mils).

Each successive sheet 202 in the pack 200 is rotated one hundred eighty degrees) (180°) relative to an adjacent sheet 202 to define the cross corrugation of the pack 200. The preferred fill pack 200, accordingly, includes alternating first and second ends 208a, 208b through its thickness to define the cross corrugation of the fill pack 200.

Figure 11:
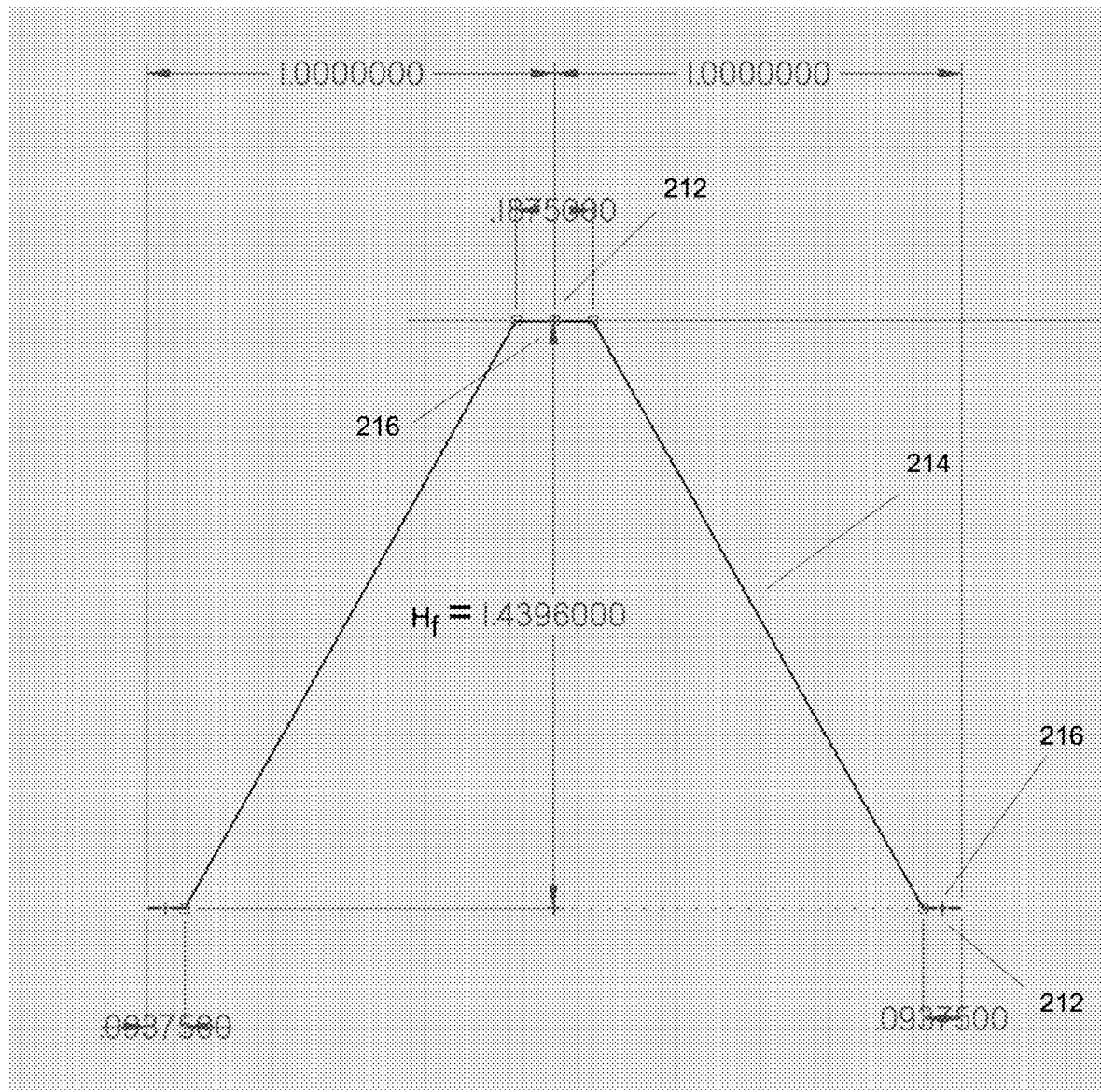
FIG. 11 is a diagram showing a transverse cross-sectional representation of the fill sheet flutes according to an embodiment of the invention.

Each fill sheet 202 is characterized by a collection of corrugations or "flutes" 210 that extend from a first end 208a in a generally diagonal direction relative to vertical axis 204 and that guide the air and water flow across the sheet. The cross-sectional shape of each flute 210, represented in FIG. 11 is generally trapezoidal with a flat ridge 212 at the top, and sloping sides 214. A flat valley 216 separates adjacent flutes 210. Opposing faces of each fill sheet 202 are mirror images of one-another, with the flat ridge 212 of one face of the fill sheet 202 constituting the flat valley 216 of the opposing face of the fill sheet and vice versa.

The flute height Hf of each flute 210 of fill sheet 202 is preferably approximately 1.44 inches, but may be in a range of approximately 1.72 to 1.15 inches. The preferred flute width (flat valley to flat valley, also flat ridge to adjacent flat ridge is 2.0 inches but may range from 2.4 to 1.6 inches. The width of each flat ridge 212 (and corresponding valley) is preferably 0.19 inches but may range from 0.23 to 0.15 inches.

The angle of the flutes 210 relative to the vertical axis 204 (flute angle Δf), is preferably approximately 17 degrees, but may be in the range of 12 to 22 degrees. Due to the diagonal orientation of the flutes 210, only the more centrally positioned flutes extend the full length of the fill sheet 202. Flutes 210 positioned toward the outside of the fill sheet 202 may begin or terminate at sides 208c or 208d; see, e.g., FIGS. 9 and 10.

Figure 12:
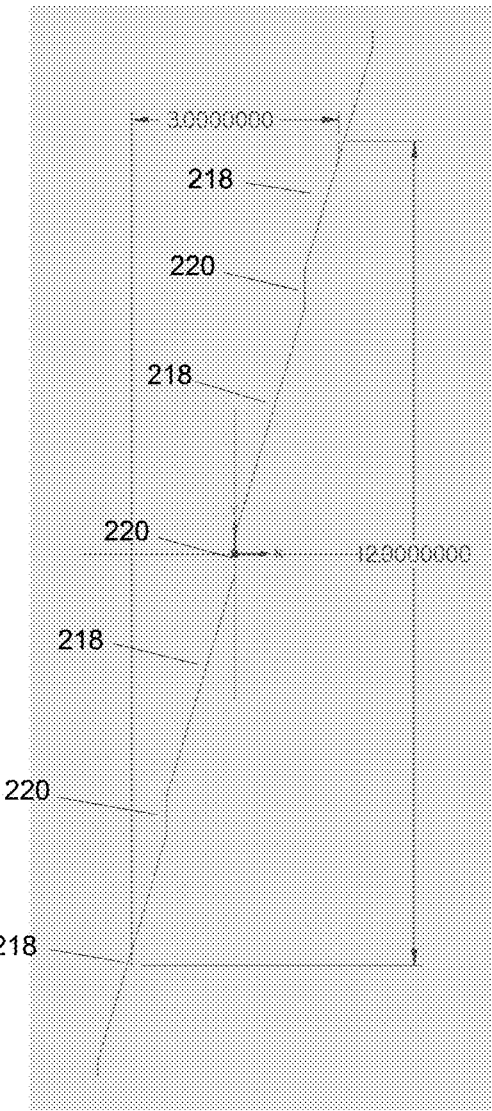
FIG. 12 is a diagram showing a 12" long longitudinal cross-sectional representation of the fill sheet flutes according to an embodiment of the invention, with microstructures removed to more clearly show the details of the flute shape.
Figure 13:
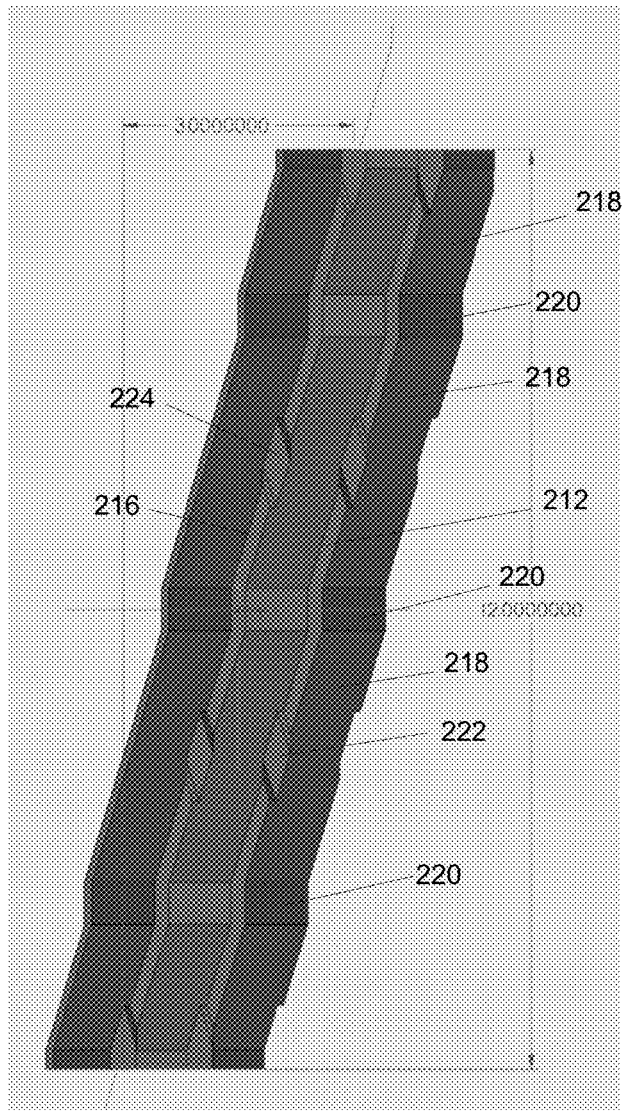
FIG. 13 is a 12" long three-dimensional representation of the fill sheet flutes according to an embodiment of the invention, microstructures not shown to more clearly reveal the details of the flute shape.

The full length of each flute 210 along the generally diagonal direction is defined more particularly by a series of long diagonal flute segments 218 interspersed by short vertical flute segments 220 as illustrated in FIGS. 12 and 13. Where uninterrupted by a sheet side 208c or 208d, the longer diagonal flute segments 218 preferably have a length of 3.42 inches and the shorter vertical flute segments 220 have a length of 0.56 inches, with a preferred ratio of longer diagonal flute segments to shorter vertical flute segments of 6.1.

Each flute flat ridge 212 on a single fill sheet 202 has a connection notch 222 at regularly spaced intervals along the flat ridge 212 where each sheet is joined to an adjacent sheet. According to a most preferred embodiment, each flute flat ridge 212 has a connection notch 222 at the top 208a, at the bottom 208b, at the half-way point between top 208a and bottom 208b of the sheet 202, and at four additional equally spaced connection notches 222 along the ridge 212 between the top 208a and the bottom 208b of the sheet for a total of eight connection notches 222 on each flat ridge 212 (spanning 2' as shown in FIGS. 9 and 10). As discussed above, opposing faces of a fill sheet 202 are mirror images of one-another; therefore, each connection notch 222 on a flat ridge 212 on one side of fill sheet 202 corresponds to an identically shaped raised plateau 224 in the flat valley 216 on the reverse side of the fill sheet. Accordingly, as each flat ridge 212 has a series of connection notches 222, each flat valley 216 has a series of plateaus 224. The connection notches 222 and plateaus 224 on each flute 210 of a fill sheet 202 are preferably aligned in rows 226 across the fill sheet 202 between sides 208c and 208d as shown in FIGS. 9 and 10, with one row 226a at the first end 208a, one row 226b at the second end 208b, two adjacent rows 226e and 226f (merged together) at the half-way point between the first end 208a and the second end 208b, and four additional rows 226c and 226d evenly spaced between first and second ends 208a and 208b, for a total of eight rows 226 across the fill sheet 202.

The connection notches 222 are designed and configured to align with and nest into corresponding notches on adjacent sheets 202 and connect the sheets 202 into the fill pack 200, such as by crush locking, fastening, clamping, adhesive bonding or other connecting mechanisms or approaches.

Figure 14:
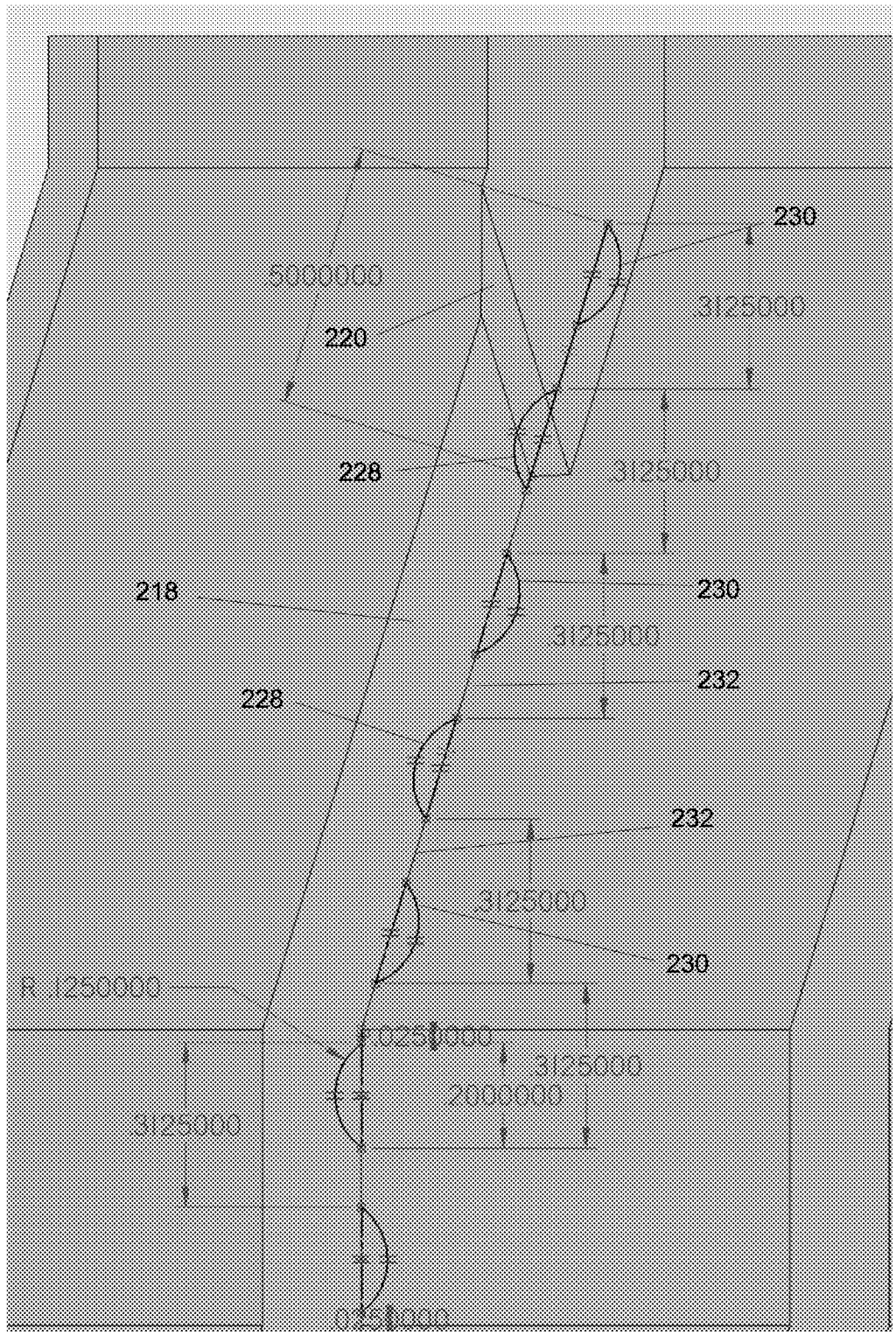
FIG. 14 is a partial representation of a single flute of the fill sheet showing the relative locations and sizes of certain microstructures according to an embodiment of the invention.
Figure 15:
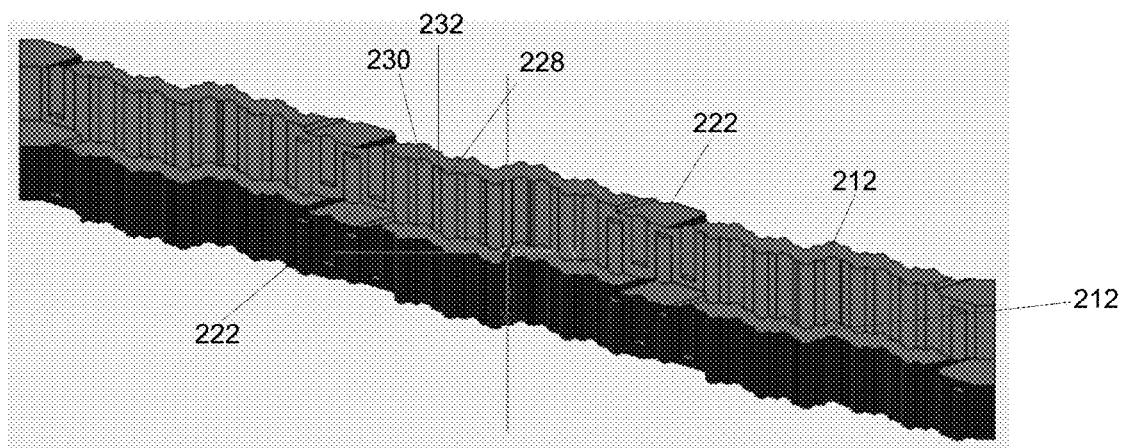
FIG. 15 is a three dimensional representation of a fill sheet flute with ribbed microstructures according to an embodiment of the invention.
Figure 16:
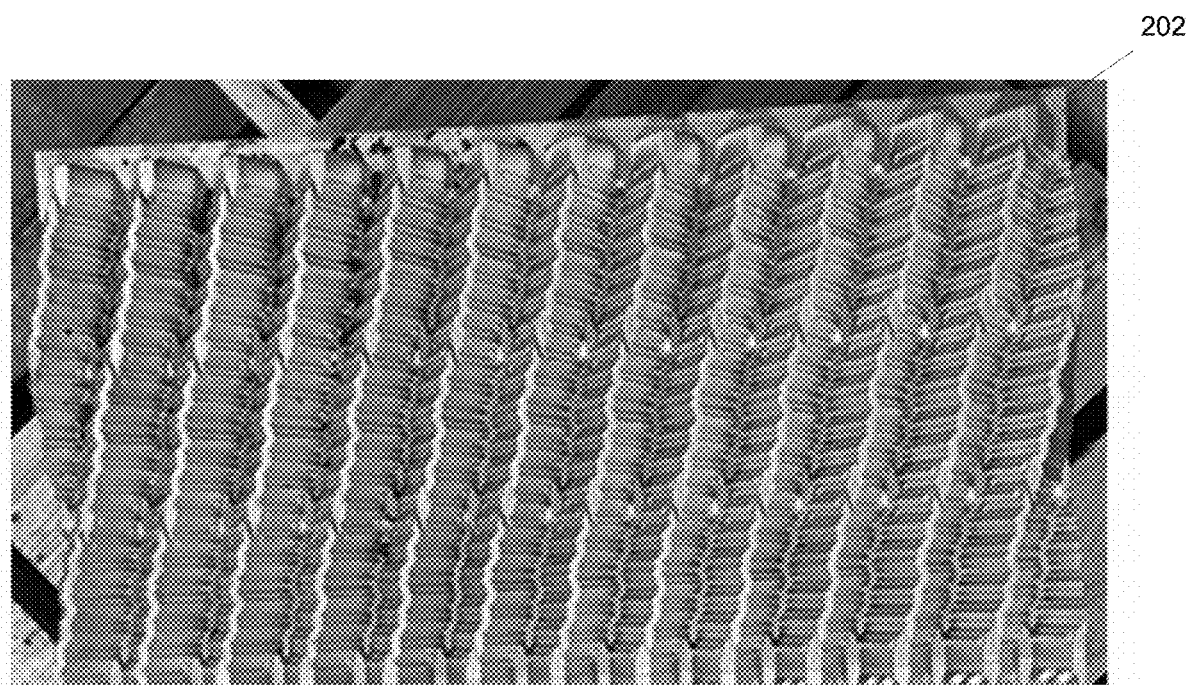
FIG. 16 is a top perspective photograph of a fill sheet having ribbed microstructures according to an embodiment of the invention.
Figure 22:
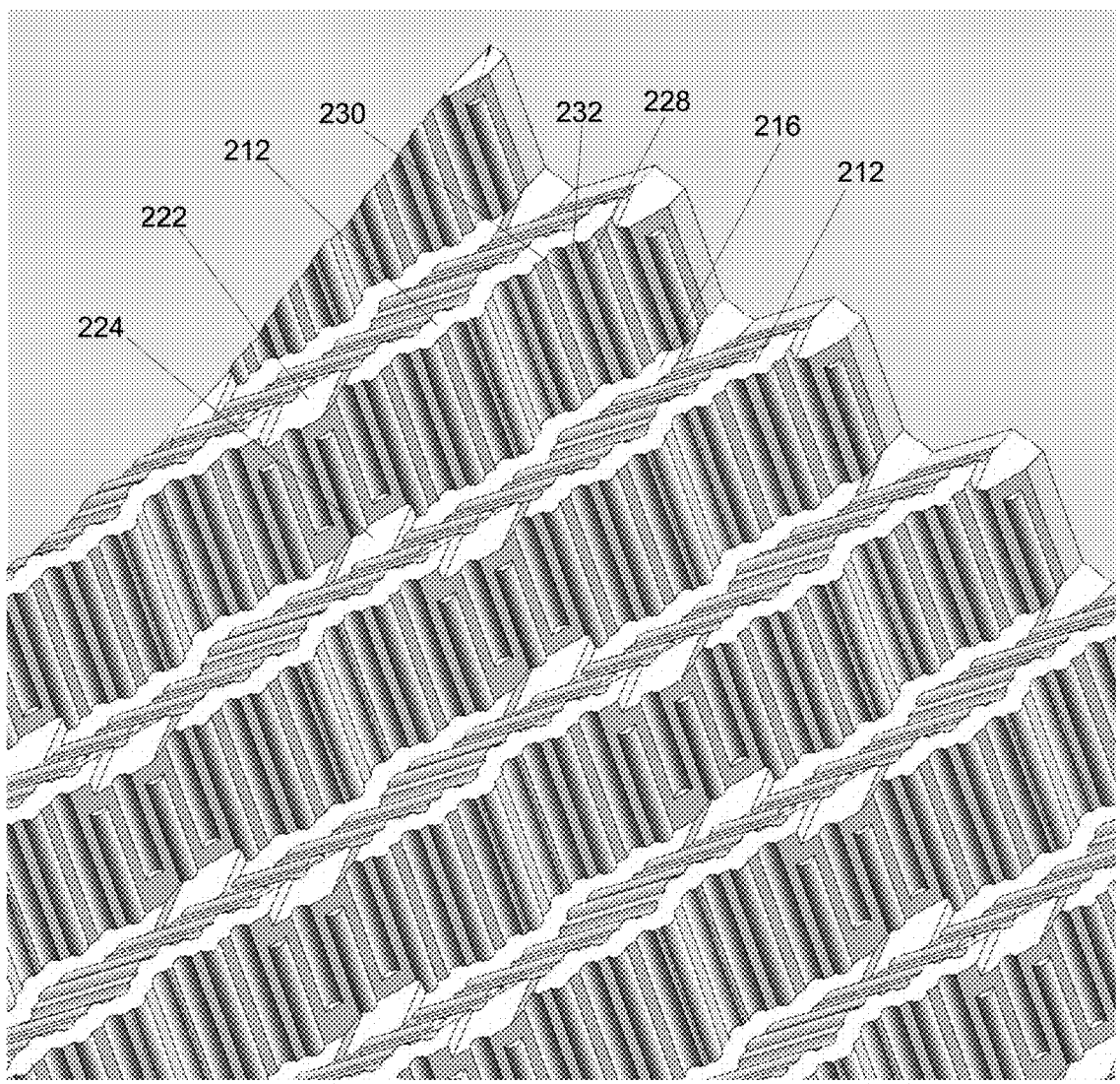
FIG. 22 is a close-up perspective view of the embodiment of perspective close-up of FIG. 16.
Figure 23:
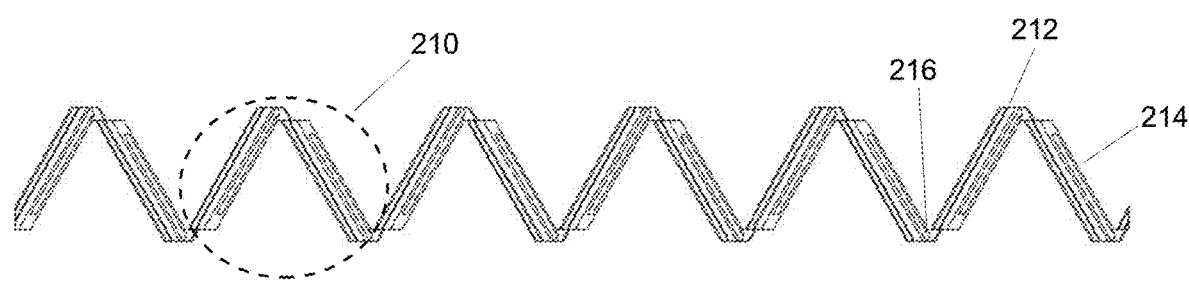
FIG. 23 is a top view of the embodiment of FIG. 9.
Figure 24:
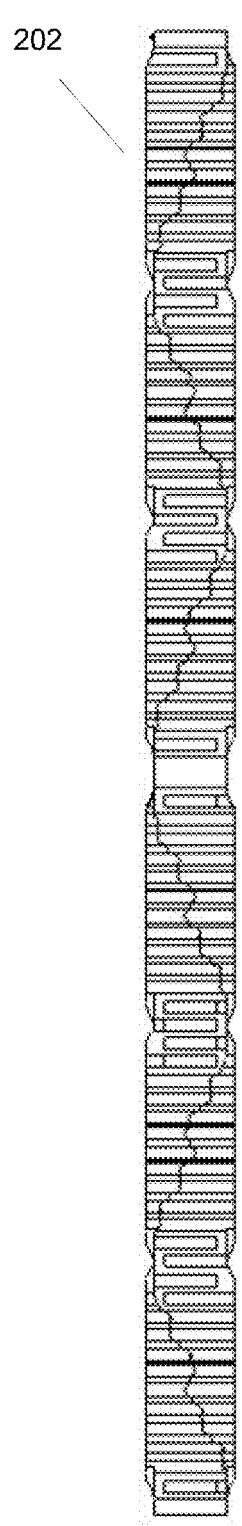
FIG. 24 is a left side view of the embodiment of FIG. 9.
Figure 25:
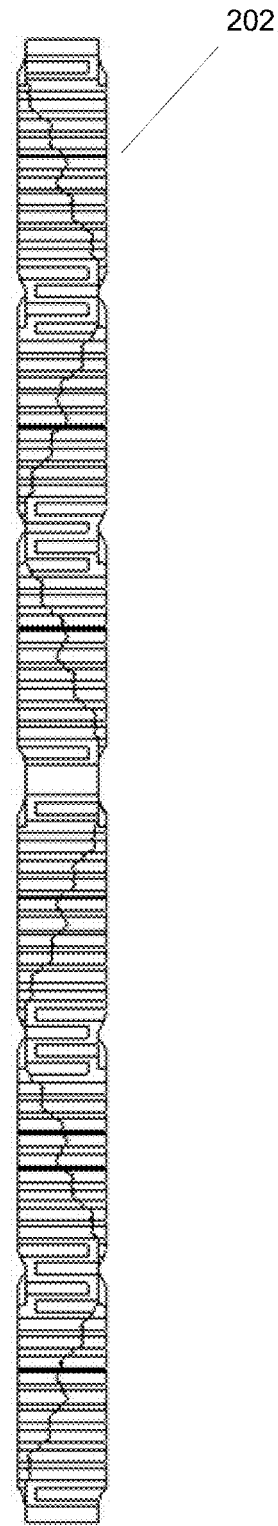
FIG. 25 is a right side view of the embodiment of FIG. 9.
Figure 26:
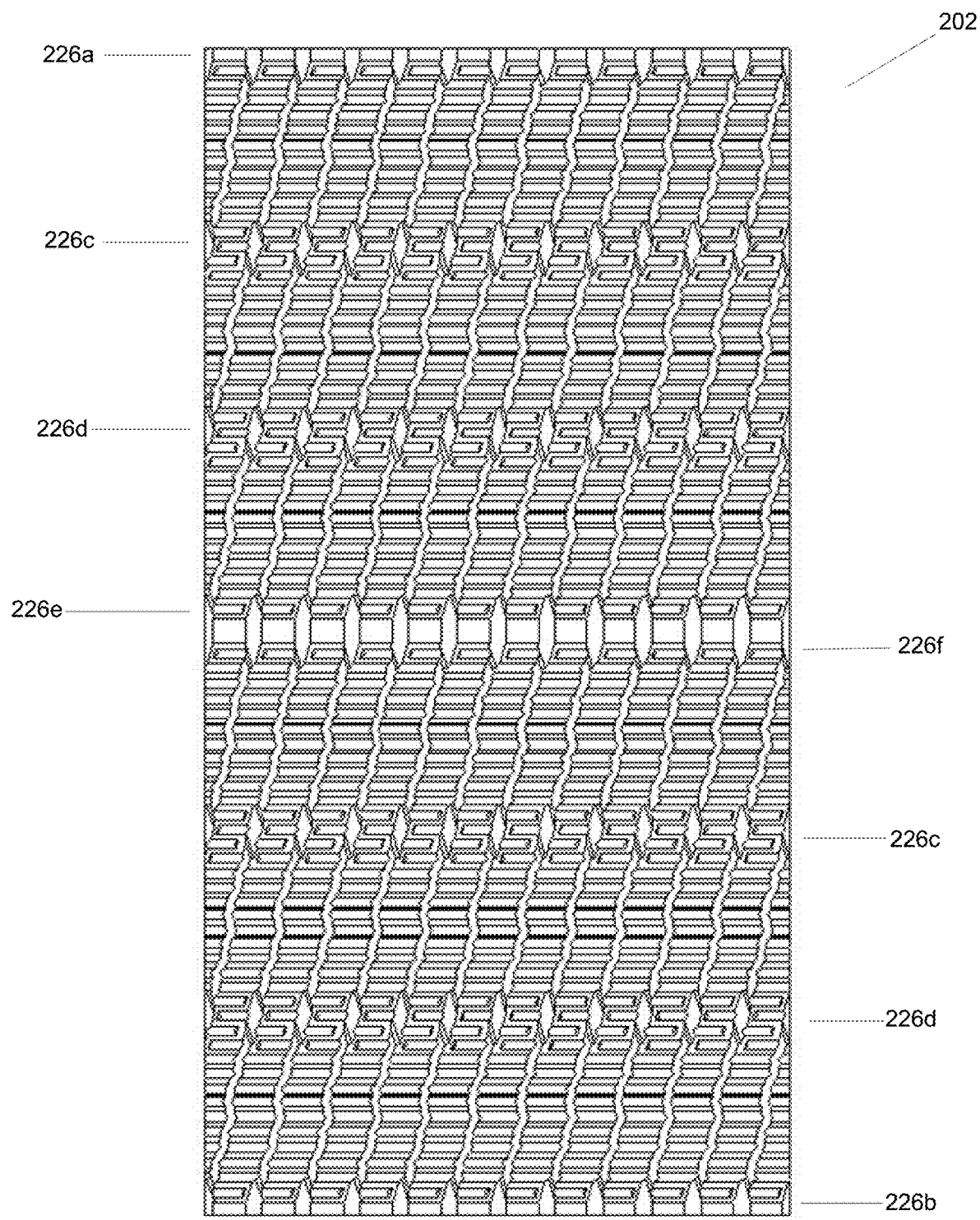
FIG. 26 is a front view of the embodiment of FIG. 9.
Figure 27:
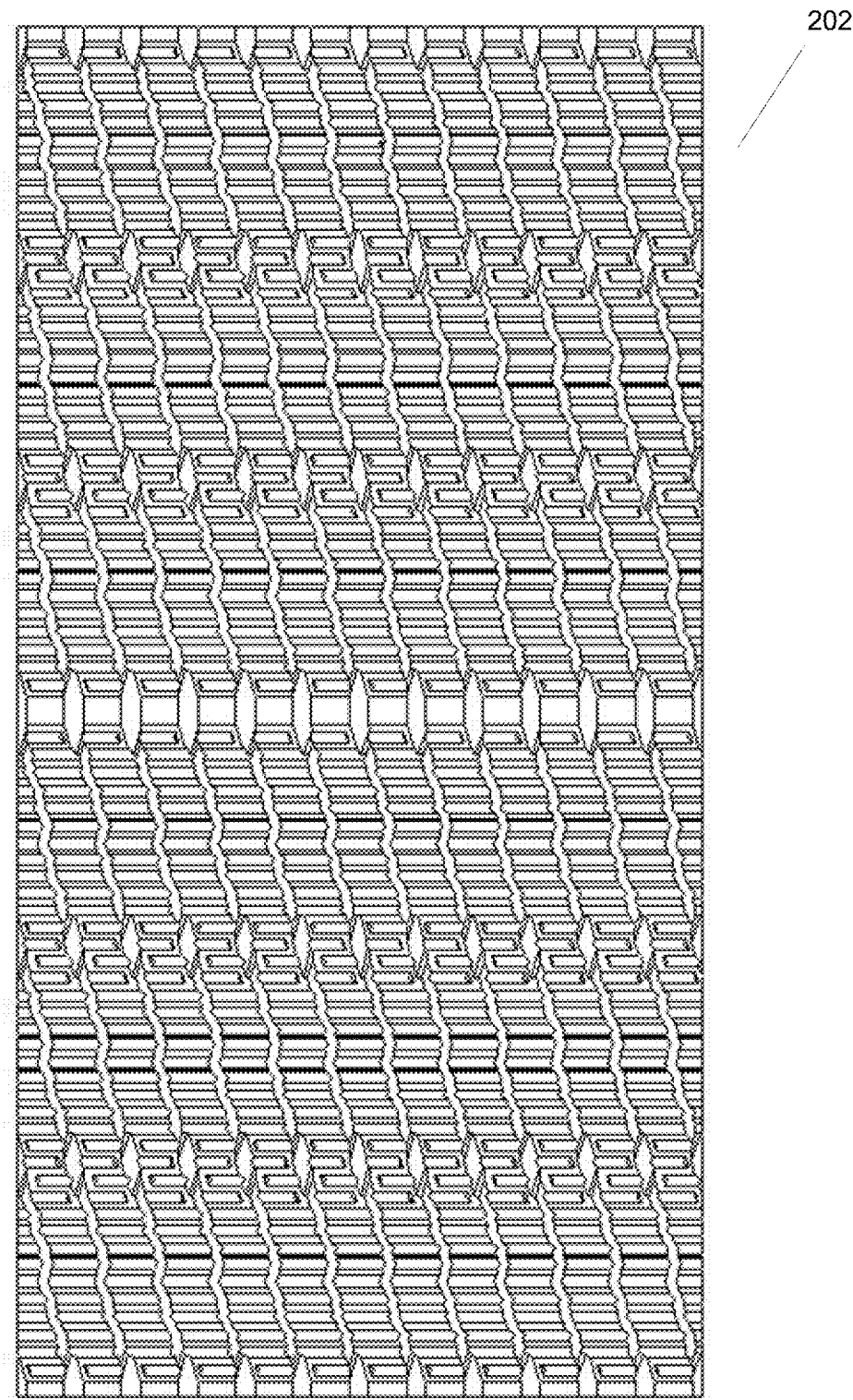
FIG. 27 is a rear view of the embodiment of FIG. 9.
Figure 28:
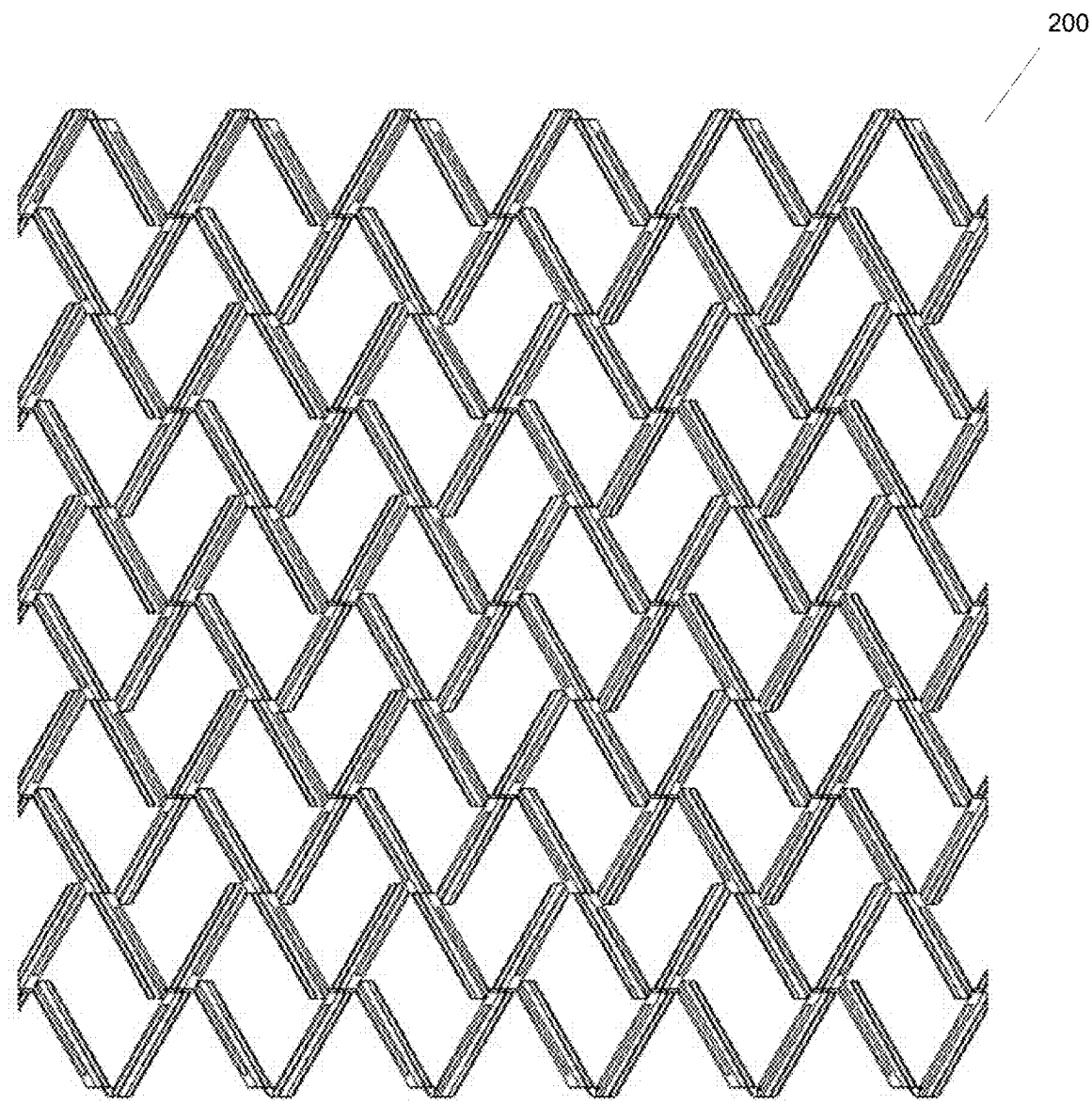
FIG. 28 is a top view of the embodiment of FIG. 10.
Figure 29:
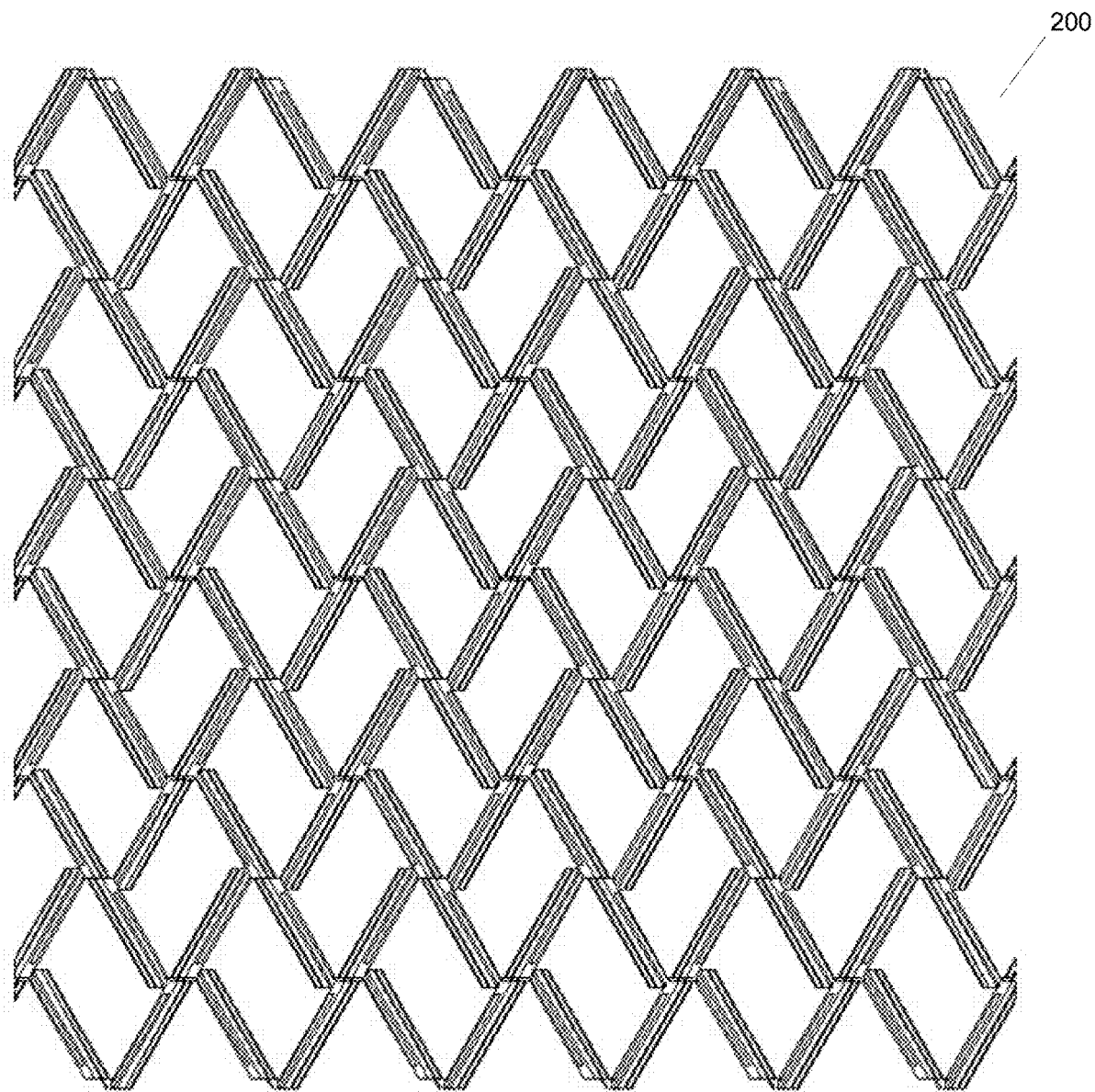
FIG. 29 is a bottom view of the embodiment of FIG. 10.
Figure 30:
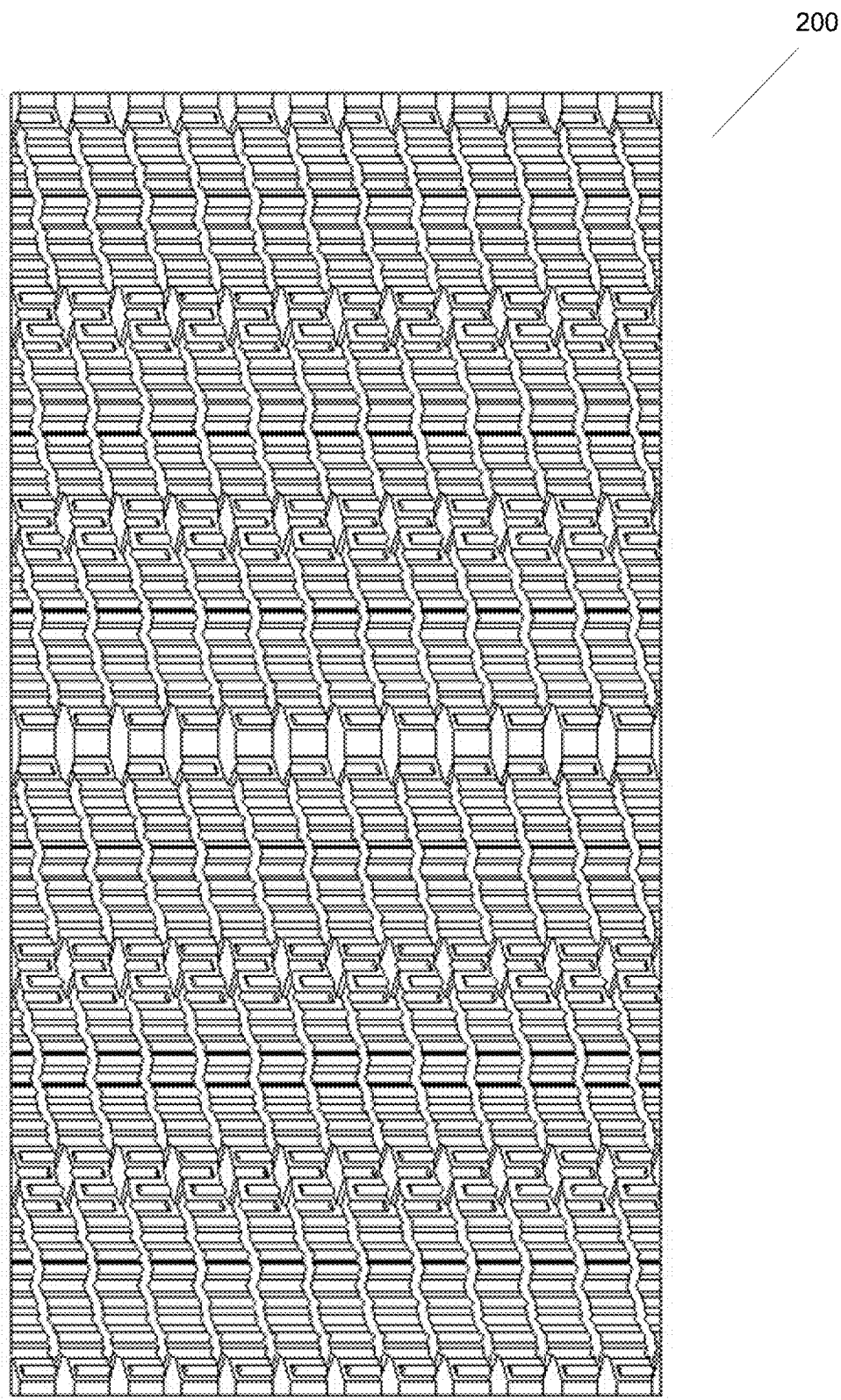
FIG. 30 shows the front and rear views of the embodiment of FIG. 10.
Figure 31:
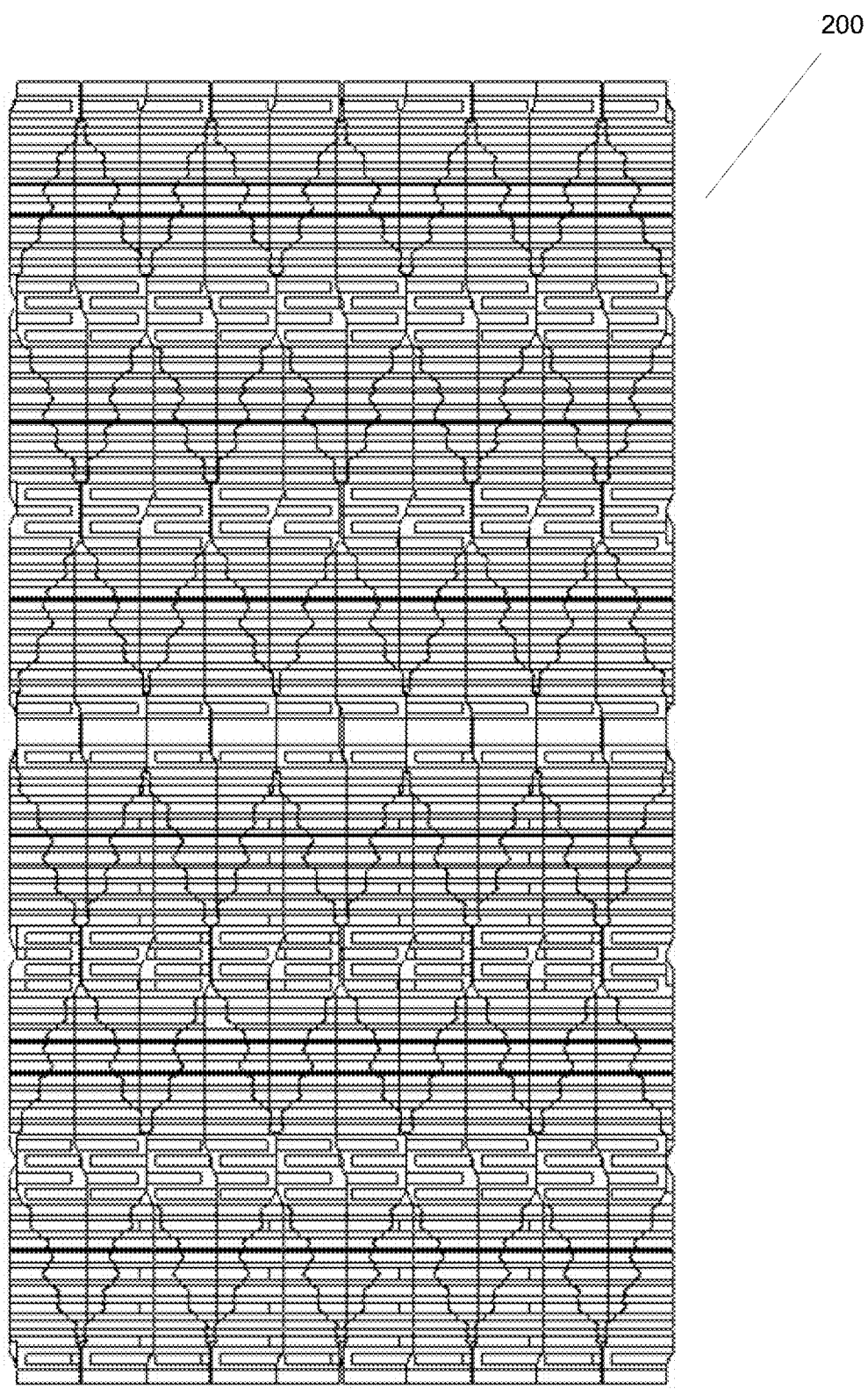
FIG. 31 shows left and right side views of the embodiment of FIG. 10.

Each flute 210 of each fill sheet 202 comprises microstructures to force water to spread across the width or across the lateral axis 206 of the sheets 202 during use for improved distribution and thorough mixing of water through the fill pack 200. According to a first "ribbed" microstructure embodiment, a series of regularly spaced elongated and rounded mounds 228 and depressions 230 traverse the sides 214 of each flute 210, separated by undeformed or flat flute side sections 232. See FIG. 14 for a representation showing the locations and spacings of the microstructures relative to each flute 210 and to one-another and FIG. 15 for a three-dimensional representation of a single (inverted) flute, showing preferred microstructure on the two flute sides 214. The most preferred height of each elongated and rounded mound 228 (and depth of each elongated and rounded depression 230) is 0.05 inches. The most preferred spacing (unmodified/flat flute side portion 232) between adjacent mounds and depressions ranges from 0.11 to 0.12 inches. The most preferred radius of curvature for each elongated and rounded mound 228 and depression 230 is 0.12 inches. As shown in FIG. 15, the elongated and rounded mounds and depressions extend all the way between adjacent edges of adjacent flat valleys 216 and flat ridges 212, except where there is a connection notch 222 or plateau 224, in which case, the rounded mounds and depressions are present between adjacent connection notches and plateaus, but do not extend the entire length therebetween. The elongated and rounded mounds 228 and depressions 230 are present on every flute 210 of a fill sheet 202 and cover the entire length of each flute 210 as shown in, for example, FIGS. 9, 10 and 22. FIG. 16 is a top perspective photograph of a fill sheet having the ribbed microstructure embodiment.

Figure 17:
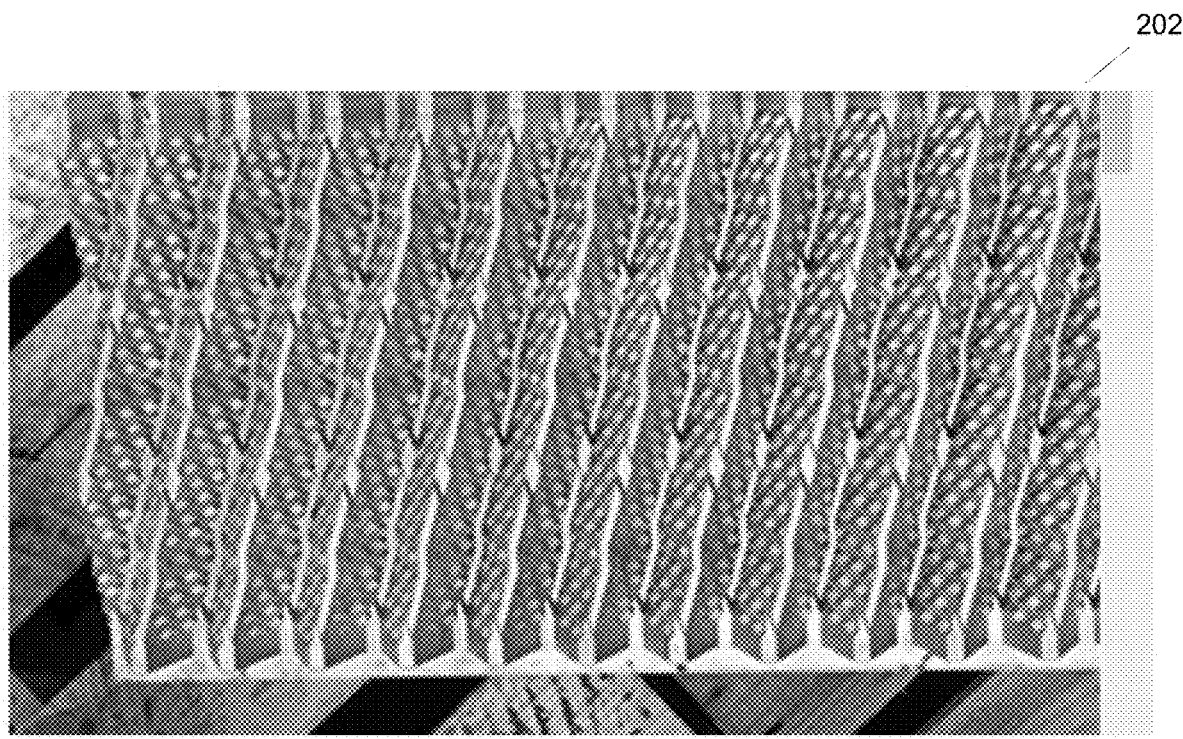
FIG. 17 is a top perspective photograph of a fill sheet having diamond shaped microstructures according to an embodiment of the invention.

FIG. 17 shows a second microstructure having diamond-shaped plateaus 234 and depressions 236 embossed into the sides of the flutes 210. As with the ribbed microstructure embodiment, the diamond microstructure embodiment is not present on the flat ridges 212 or flat valleys 216 of the flutes 210.

Figure 18:
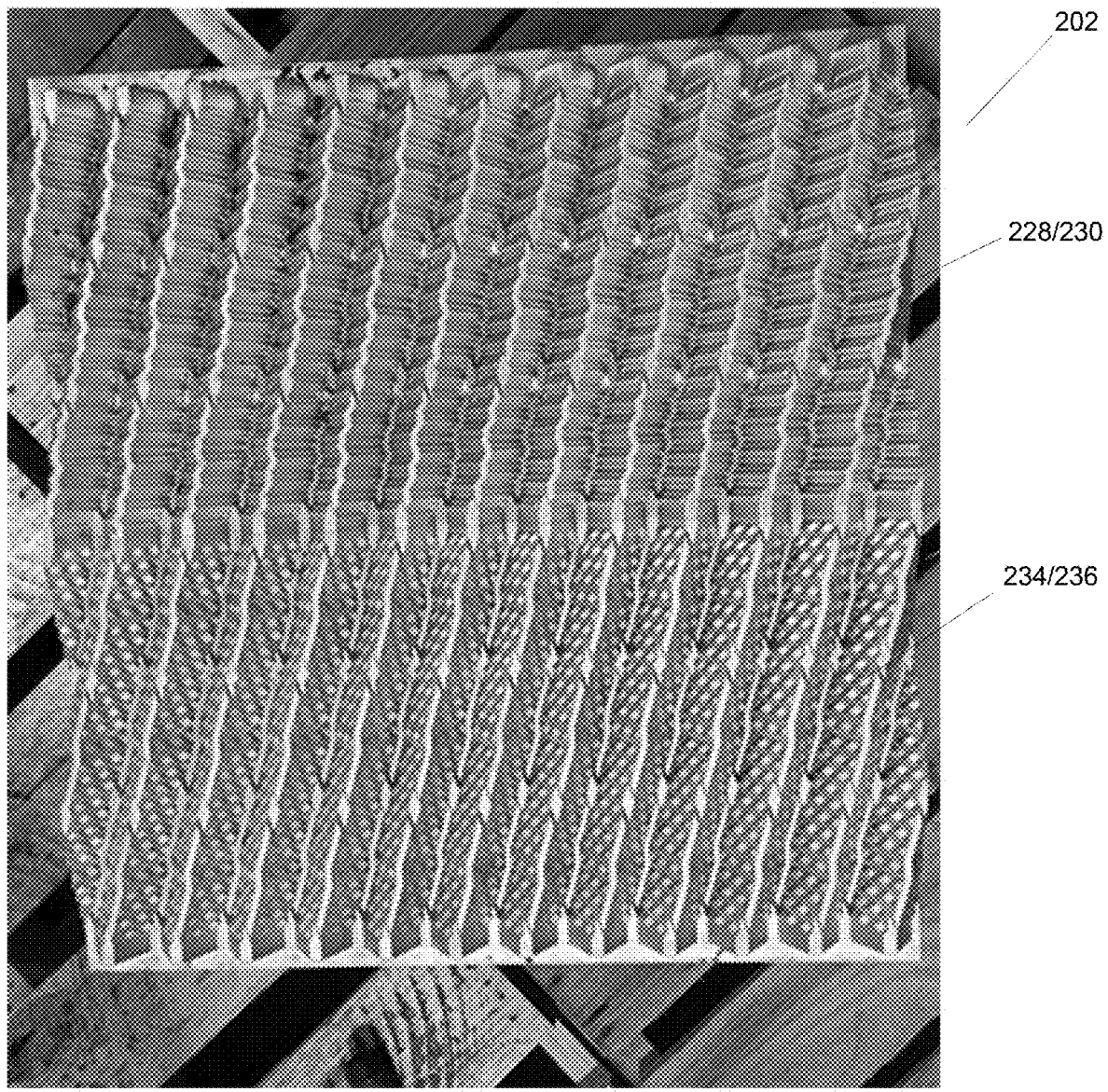
FIG. 18 is a top perspective photograph of a fill sheet having ribbed microstructures attached to a fill sheet having diamond shaped microstructures according to an embodiment of the invention.
Figure 19:
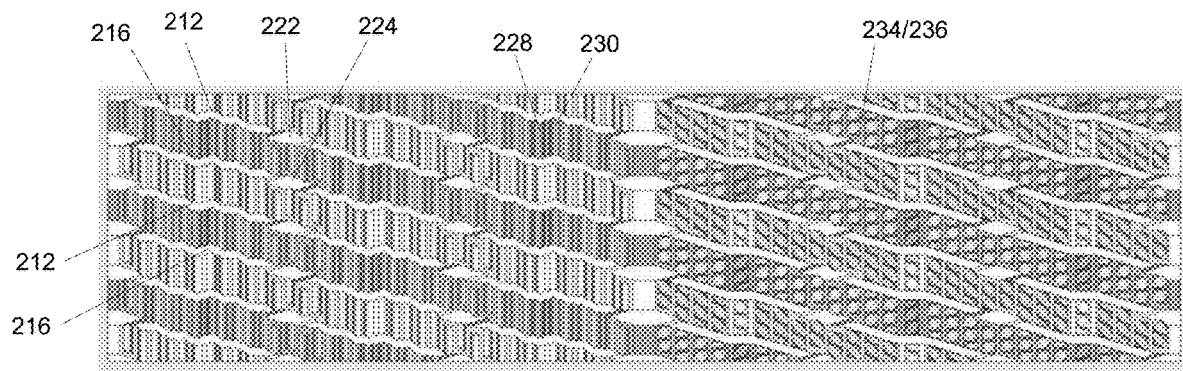
FIG. 19 is a diagram showing a closeup of the embodiment shown in FIG. 18.

FIG. 18 shows a fill sheet according to the invention having the ribbed microstructure embodiment on one half of a fill sheet 202, and according to the invention having the diamond microstructure embodiment on the other half of a fill sheet 202. FIG. 19 is a diagram showing a closeup of the embodiment shown in FIG. 18.

Figure 20:
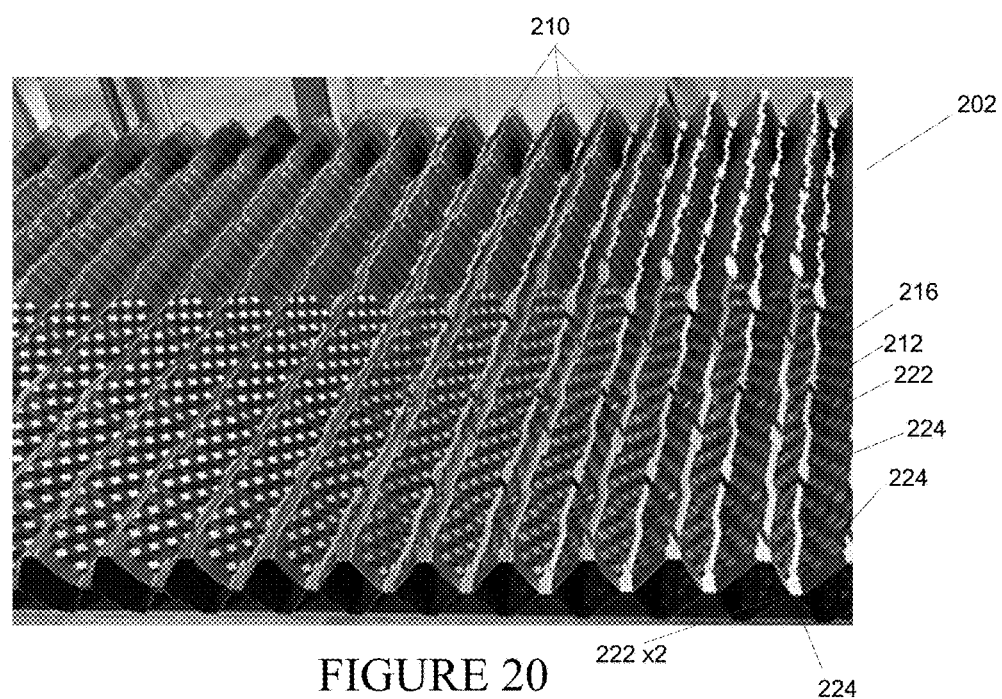
FIG. 20 is an end perspective photograph of the embodiment shown in FIG. 17.
Figure 21:
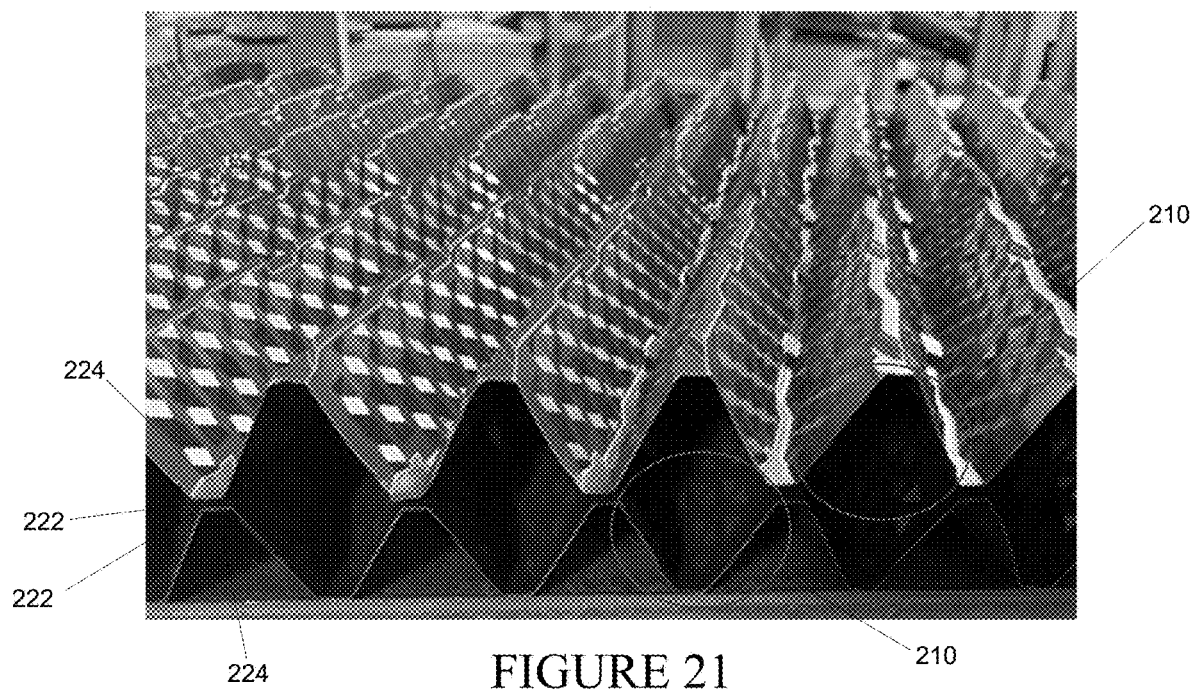
FIG. 21 is a shallower close-up view of the embodiment of FIGS. 18-20.

FIGS. 20 and 21 show two fill sheets 202 of the type shown in FIG. 18 connected together where connection notches 222 on the flat ridges 212 of a first fill sheet mate with and nestle within the connection notches 222 on the flat ridges 212 of a second fill sheet 202.

The most preferred fill pack of the present invention—10 fill sheets per 1 cubic foot of fill, with the disclosed flute configuration (overall diagonal orientation achieved by longer diagonal segments separated by shorter vertical segments) coupled with the disclosed microstructure embodiments and eight rows of connection notches/plateaus unexpectedly resulted in improvement performance-to-cost ratio over prior art fill packs.

For these reasons, the design of the preferred cross corrugated media or fill sheets 202 and assembled fill pack 200 is novel, inventive, and has significant commercial value over the existing commodity product offered in the market.

It will be appreciated by those skilled in the art that changes could be made to the preferred embodiments described above without departing from the inventive concept thereof. It is understood, therefore, that this invention is not limited to the particular embodiments disclosed, but it is intended to cover modifications within the spirit and scope of the present invention as outlined in the present disclosure and defined according to the broadest reasonable reading of the claims that follow, read in light of the present specification.

What is claimed:

1. A fill sheet for assembly into a fill pack for cooling a cooling medium in an evaporative cooling tower, the fill sheet comprising:
    a first end;
    a second end extending substantially parallel to the first end and generally perpendicularly relative to a vertical axis, the first and second ends extending substantially parallel to a lateral axis of the fill sheet;
    a plurality of flutes extending generally toward the second end at a first flute angle relative to the vertical axis; and
    microstructure defined on the plurality of flutes,
    said plurality of flutes comprising a plurality of alternating diagonal flute segments having a diagonal flute segment length and vertical flute segments having a vertical flute segment length,
    said diagonal flute segments having a diagonal flute segment length aligned parallel to said first flute angle and said vertical flute segments aligned parallel to said vertical axis, whereas said diagonal flute segment length is 6.1 times said vertical flute segment length;
    the microstructure comprising a plurality of alternating rounded mounds and rounded depressions extending between flat ridge edges and flat valley edges of said flutes.

2. The fill sheet of claim 1, wherein the microstructure extends substantially parallel to the lateral axis.

3. The fill sheet of claim 1, wherein the first flute angle is approximately 12 to 22 degrees.

4. The fill sheet of claim 1, wherein the plurality of flutes define a flute height, the flute height being approximately 1.44 inches.

5. The fill sheet of claim 1, wherein said rounded mounds of the microstructure have a height of 0.05 inches and a spacing of 0.11 to 0.12 inches along said flutes.

6. A cross corrugated fill pack assembly for cooling a fluid flowing through the pack with a gas flowing through the pack in a substantially opposing direction, the fill pack assembly comprising a plurality of identical fill sheets according to claim 1, wherein said plurality of fill sheets are arranged so that adjacent sheets are oriented 180 degrees relative to one-another and are attached to each other at corresponding attachment notches located on flute ridges of adjacent fill sheets.

7. A cross corrugated fill pack assembly for cooling a fluid flowing through the pack with a gas flowing through the pack in a substantially opposing direction, the fill pack assembly comprising a plurality of identical fill sheets according to claim 2, wherein said plurality of fill sheets are arranged so that adjacent sheets are oriented 180 degrees relative to one-another and are attached to each other at corresponding attachment notches located on flute ridges of adjacent fill sheets.

8. A cross corrugated fill pack assembly for cooling a fluid flowing through the pack with a gas flowing through the pack in a substantially opposing direction, the fill pack assembly comprising a plurality of identical fill sheets according to claim 3, wherein said plurality of fill sheets are arranged so that adjacent sheets are oriented 180 degrees relative to one-another and are attached to each other at corresponding attachment notches located on flute ridges of adjacent fill sheets.

9. A cross corrugated fill pack assembly for cooling a fluid flowing through the pack with a gas flowing through the pack in a substantially opposing direction, the fill pack assembly comprising a plurality of identical fill sheets according to claim 4, wherein said plurality of fill sheets are arranged so that adjacent sheets are oriented 180 degrees relative to one-another and are attached to each other at corresponding attachment notches located on flute ridges of adjacent fill sheets.

10. A cross corrugated fill pack assembly for cooling a fluid flowing through the pack with a gas flowing through the pack in a substantially opposing direction, the fill pack assembly comprising a plurality of identical fill sheets according to claim 5, wherein said plurality of fill sheets are arranged so that adjacent sheets are oriented 180 degrees relative to one-another and are attached to each other at corresponding attachment notches located on flute ridges of adjacent fill sheets.

* * * * *